(12) United States Patent
Tripathy et al.

(10) Patent No.: US 9,238,763 B2
(45) Date of Patent: Jan. 19, 2016

(54) TACKIFIED POLYOLEFIN ADHESIVE COMPOSITIONS

(71) Applicant: ExxonMobil Chemical Patents Inc., Baytown, TX (US)

(72) Inventors: Ranjan Tripathy, League City, TX (US); Jennifer J. Austin, The Woodlands, TX (US); James N. Coffey, League City, TX (US); Yann Devorest, Waterloo (BE); Jurgen J. Schroeyers, Helchteren (BE); Joseph M. Delucia, Pittsburgh, PA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/510,152

(22) Filed: Oct. 9, 2014

(65) Prior Publication Data

US 2015/0112014 A1 Apr. 23, 2015

Related U.S. Application Data

(60) Provisional application No. 61/892,813, filed on Oct. 18, 2013.

(51) Int. Cl.
| | |
|---|---|
| *B60C 1/00* | (2006.01) |
| *C08J 3/22* | (2006.01) |
| *C09J 123/16* | (2006.01) |
| *C09J 123/12* | (2006.01) |
| *C09J 123/14* | (2006.01) |

(52) U.S. Cl.
CPC .............. *C09J 123/16* (2013.01); *C09J 123/12* (2013.01); *C09J 123/14* (2013.01)

(58) Field of Classification Search
CPC ....... C09J 123/16; C09J 123/12; C09J 123/14
USPC ........................................................ 524/526
See application file for complete search history.

(56) References Cited

U.S. PATENT DOCUMENTS

| 7,232,871 B2 | 6/2007 | Datta et al. |
| 7,294,681 B2 * | 11/2007 | Jiang ................... C08F 10/00 |
| | | 526/114 |
| 7,524,910 B2 | 4/2009 | Jiang et al. |
| 7,601,666 B2 | 10/2009 | Rix et al. |

FOREIGN PATENT DOCUMENTS

WO 2013-134038 9/2013

OTHER PUBLICATIONS

Cheng, H.N. "$^{13}$ C NMR Analysis of Ethylene-Propylene Rubbers" Macromolecules, 1984, 17, pp. 1950-1955.
Sun, T. et al. "Effect of Short Chain Branching on the Coil Dimensions of Polyolefins in Dilute Solution" Macromolecules, 2001, 34, pp. 6812-6820.
Wake, W. C., Adhesion and the Formulation of Adhesives, pp. 190-192, 224, 2$^{nd}$ Ed. (1982).

* cited by examiner

Primary Examiner — Hui Chin
(74) Attorney, Agent, or Firm — Priya G. Prasad

(57) ABSTRACT

The present invention is related to adhesive compositions comprising a polymer blend of at least two different propylene-based polymers and one or more tackifiers. The polymer blend has a melt viscosity of about 900 cP to about 19,000 cP. When subjected to Temperature Rising Elution Fractionation, the polymer blend exhibits a first fraction that is soluble at −15° C. in xylene, the first fraction having an isotactic (mm) triad tacticity of about 70 mol % to about 90 mol %; and a second fraction that is insoluble or less soluble than the first fraction at −15° C. in xylene, the second fraction having an isotactic (mm) triad tacticity of about 85 mol % to about 98 mol %. The tackifier has a softening point, as determined by ASTM E-28, of about 85 to about 135° C. and an aromaticity of about 2 to about 12 mol % aromatic protons.

21 Claims, 1 Drawing Sheet

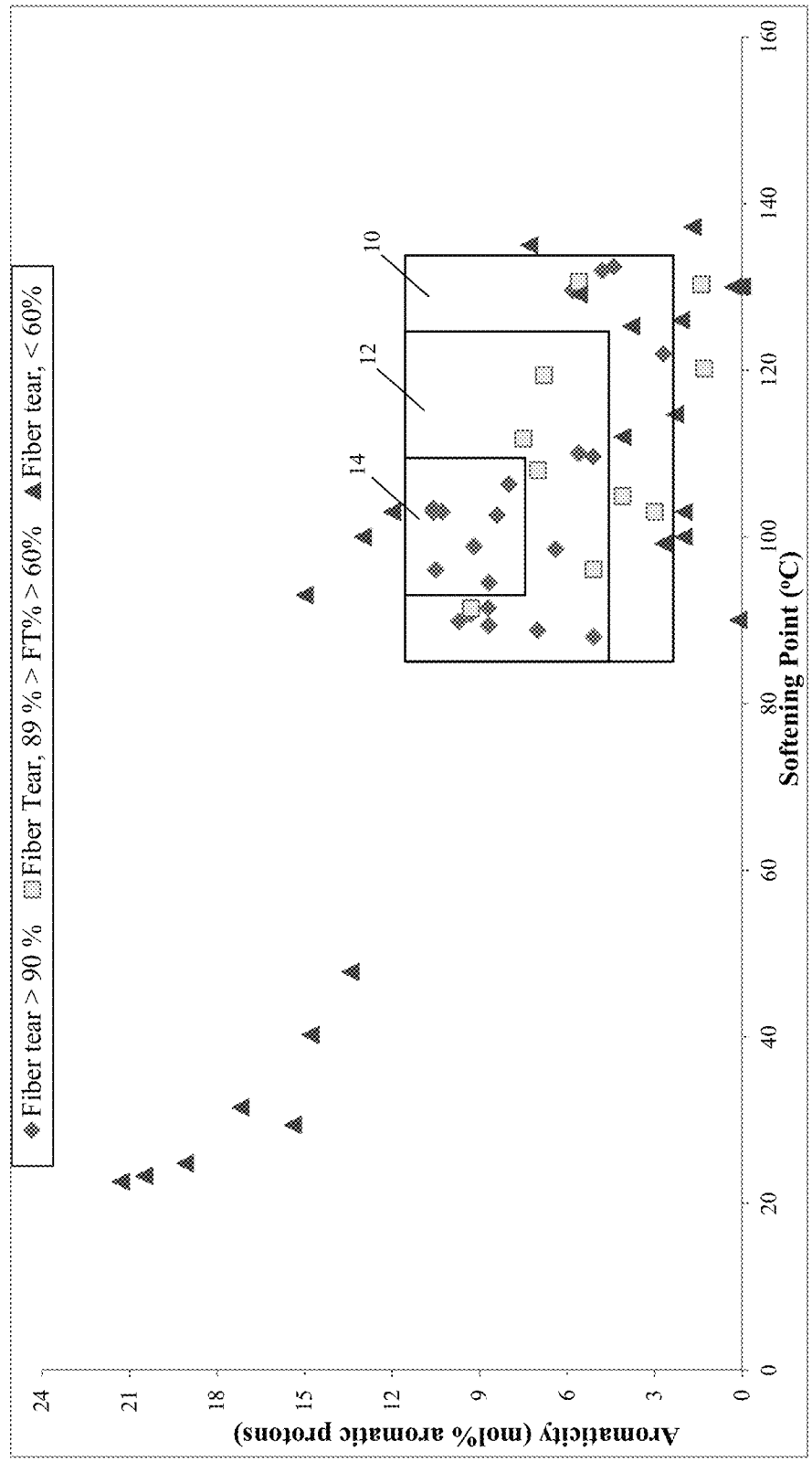

US 9,238,763 B2

TACKIFIED POLYOLEFIN ADHESIVE COMPOSITIONS

CROSS REFERENCE TO RELATED APPLICATIONS

This application claims the benefit of priority to U.S. Provisional Application No. 61/892,813, filed Oct. 18, 2013, the disclosure of which is fully incorporated herein by reference.

FIELD OF INVENTION

The invention relates to a polyolefin adhesive composition comprising a tackifier.

BACKGROUND

Adhesive composition components such as base polymers, tackifiers, and waxes are customarily provided as separate components for formulation into hot melt adhesive (HMA) compositions. In HMA packaging applications, adhesive compositions are sought that provide a desired combination of physical properties, such as reduced set time and improved mechanical strength, including fiber tear and failure mode.

Exemplary base polymer compositions and methods of making polymer compositions for HMA applications are disclosed in U.S. Pat. Nos. 7,294,681 and 7,524,910. Various polymers described in these patents and/or produced by the methods disclosed in these patents have been sold by Exxon-Mobil Chemical Company as LINXAR™ polymers. In addition, the process platform described in these patents can sometimes be of limited robustness for developing new products or altering product design to satisfy customer needs.

WO Publication No. 2013/134038 discloses a method for producing a polymer blend having at least two different propylene-based polymers produced in parallel reactors. The multi-modal polymer blend has a Mw of about 10,000 g/mol to about 150,000 g/mol. When subjected to Temperature Rising Elution Fractionation, the polymer blend exhibits a first fraction that is soluble at −15° C. in xylene, the first fraction having an isotactic (mm) triad tacticity of about 70 mol % to about 90 mol %; and a second fraction that is insoluble or less soluble than the first fraction at −15° C. in xylene, the second fraction having an isotactic (mm) triad tacticity of about 85 mol % to about 98 mol %.

Tackifiers in HMA applications are generally disclosed in William C. Wake, *Adhesion and the Formulation of Adhesives*, pp. 190-92, 224 (2d ed. 1982) and in Michael and Irene Ash, *Formulary of Adhesives and Sealants*, Ch. 3 (1987). Although many different types of tackifiers are known and have been used in HMA adhesive formulations, there remains a need for tackified adhesive formulations that utilize the new base polymers to achieve equivalent or better adhesive performance attributes, including fiber tear, set time, and failure mode, to HMA adhesive formulations that are currently available.

Accordingly, the present invention is directed to a tackified adhesive compositions utilizing the new polymer blends, such that the adhesive compositions have superior fiber tear, set time, and failure mode compared to commercial HMA adhesive formulations.

SUMMARY

The foregoing and/or other challenges are addressed by the methods and products disclosed herein.

In one aspect, a polymer blend and a tackifier is provided for use in an adhesive composition. The polymer blend includes a first predominantly propylene-based polymer, wherein the first predominantly propylene-based polymer is a homopolymer of propylene or a copolymer of propylene and ethylene or a $C_4$ to $C_{10}$ alpha-olefin; and a second predominantly propylene-based polymer, wherein the second predominantly propylene-based polymer is a homopolymer of propylene or comprises a comonomer of ethylene or a $C_4$ to $C_{10}$ alpha-olefin; wherein the second predominantly propylene-based polymer is compositionally different than the first predominantly propylene-based polymer. The polymer blend has a melt viscosity, measured at 190° C. of about 900 cP to about 19,000 cP. When subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble or less soluble than the first fraction at −15° C. in xylene, the second fraction having an isotactic (mm) triad tacticity of about 85 mol % to about 98 mol %. The tackifier has a softening point, as determined by ASTM E-28, of about 85 to about 135° C. and an aromaticity of about 2 to about 12 mol % aromatic protons.

In another aspect, a polymer blend and a tackifier is provided for use in an adhesive composition. The polymer blend includes a first predominantly propylene-based polymer, wherein the first predominantly propylene-based polymer is a homopolymer of propylene or comprises a copolymer of propylene and ethylene or a $C_4$ to $C_{10}$ alpha-olefin; and a second predominantly propylene-based polymer, wherein the second predominantly propylene-based polymer is a homopolymer of propylene or comprises a copolymer of propylene and ethylene or a $C_4$ to $C_{10}$ alpha-olefin; wherein the second predominantly propylene-based polymer is compositionally different than the first predominantly propylene-based polymer. The polymer blend has a melt viscosity, measured at 190° C. of about 900 cP to about 19,000 cP. When subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble or less soluble than the first fraction at −15° C. in xylene, the second fraction having an isotactic (mm) triad tacticity of about 85 mol % to about 98 mol %. The adhesive composition has a viscosity, measured at 177° C. and determined according to ASTM D-3236, from about 350 cP to about 2,000 cP.

These and other aspects of the present inventions are described in greater detail in the following detailed description and are illustrated in the accompanying figure and tables.

BRIEF DESCRIPTION OF THE DRAWING

FIG. 1 depicts fiber tear adhesive performance of tackified hot melt adhesive formulations arranged by the softening point and aromaticity of the tackifier(s) used in the formulation.

DETAILED DESCRIPTION

It has been discovered that adding one or more tackifiers, with a specific softening point and aromaticity, to form adhesive compositions results in advantageous properties for the adhesive compositions, including set time and fiber tear equivalent to or better than commercial adhesive formulations. The inventive adhesives utilize base polymers that may be produced using a new process platform that is more robust and lacks many of the limitations and difficulties associated with the processes employed to make LINXAR™ polymers and those disclosed in U.S. Pat. Nos. 7,294,681 and 7,524,910.

Advantageously, tackifiers used in the adhesive composition have a softening point, as determined by ASTM E-28, of about 85 to about 135° C. and an aromaticity of about 2 to about 12 mol % aromatic protons.

"Softening Point" is the temperature, measured in ° C., at which a material will flow, as determined by ASTM E-28. "Aromaticity" is determined by NMR spectroscopy and is measured in mol % of aromatic protons.

Advantageously, polymers used in the adhesive composition can be produced using the new process platform that share many of the characteristics of the LINXAR™ polymers that make the LINXAR™ polymers excellent polymers for use in adhesive applications. New polymers can be produced using the new process platform that possess other characteristics that, although differentiate the polymers from the LINXAR™ polymers, are believed to contribute to the new polymers' excellent adhesive performance. These polymers may also, when subjected to Temperature Rising Elution Fractionation, exhibit a first fraction that is soluble at −15° C. in xylene, and a second fraction that is insoluble or less soluble than the first fraction at −15° C. in xylene. The first fraction may have an isotactic (mm) triad tacticity of about 70 mol % to about 90 mol %, and the second fraction may have an isotactic (mm) triad tacticity of about 85 mol % to about 98 mol %. In preferred embodiments, portions of each polymer of the polymer blend are represented in each fraction.

A. Methods of Preparing Polyolefin Adhesive Components and Compositions

A solution polymerization process for preparing a polyolefin adhesive component is generally performed by a system that includes a first reactor, a second reactor in parallel with the first reactor, a liquid-phase separator, a devolatilizing vessel, and a pelletizer. The first reactor and second reactor may be, for example, continuous stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final polymer blend. For adhesive compositions, ethylene and hexene are particularly preferred comonomers for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second reactor may receive a third monomer feed of a third monomer, a fourth monomer feed of a fourth monomer, and a catalyst feed of a second catalyst. The second reactor may also receive feeds of a solvent and activator. The solvent and/or the activator feed may be combined with any of the third monomer feed, the fourth monomer feed, or second catalyst feed, or the solvent and activator may be supplied to the reactor in separate feed streams. A second polymer is produced in the second reactor and is evacuated from the second reactor via a second product stream. The second product stream comprises the second polymer, solvent, and any unreacted monomer.

In any embodiment, the third monomer may be propylene and the fourth monomer may be ethylene or a $C_4$ to $C_{10}$ olefin. In any embodiment, the fourth monomer may be ethylene, butene, hexene, and octene. In any embodiment, the relative amounts of propylene and comonomer supplied to the second reactor may be designed to produce a polymer that is predominantly propylene, i.e., a polymer that is more than 50 mol % propylene. In another embodiment, the second reactor may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer. Specific examples of the types of polymers that may be combined to produce advantageous blends are described in greater detail herein.

It should be appreciated that any number of additional reactors may be employed to produce other polymers that may be integrated with (e.g., grafted) or blended with the first and second polymers. In any embodiment, a third reactor may produce a third polymer. The third reactor may be in parallel with the first reactor and second reactor or the third reactor may be in series with one of the first reactor and second reactor.

Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. The concentration of polymer in the polymer lean phase may be further reduced by catalyst selection. Catalysts of Formula I (described below), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the multi-modal polymer blend is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art.

WO Publication No. 2013/134038 generally describes the method of preparing polyolefin adhesive components and compositions. The contents of WO Publication No. 2013/134038 and its parent application U.S. Patent Application Ser. No. 61/609,020 filed Mar. 9, 2012, are both incorporated herein in their entirety.

B. Polymers

Preferred polymers are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "polymer blend" as used herein includes, but is not limited to a blend of one or more polymers prepared in solution or by physical blending, such as melt blending.

"Propylene-based" or "predominantly propylene-based" as used herein, is meant to include any polymer comprising propylene, either alone or in combination with one or more comonomers, in which propylene is the major component (i.e., greater than 50 mol % propylene).

In any embodiment, one or more polymers of the blend may comprise one or more propylene-based polymers, which comprise propylene and from about 5 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more polymers of the blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 130° C., or less than about 120° C., or less than about 115° C., or less than about 110° C., or less than about 100° C., or less than about 90° C. In any embodiment, the Tm of the one or more polymers of the blend may be greater than about 25° C., or greater than about 30° C., or greater than about 35° C., or greater than about 40° C.

In one or more embodiments, the first crystallization temperature (Tc1) of the polymer (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc1 of the polymer is greater than about 0° C., or greater than about 5° C., or greater than about 10° C., or greater than about 15° C., or greater than about 20° C. In any embodiment, the Tc1 lower limit of the polymer may be 0° C., 5° C., 10° C., 20° C., 30° C., 40° C., 50° C., 60° C., and 70° C.; and the Tc1 upper limit temperature may be 100° C., 90° C., 80° C., 70° C., 60° C., 50° C., 40° C., 30° C., 25° C., and 20° C. with ranges from any lower limit to any upper limit being contemplated.

In one or more embodiments, the second crystallization temperature (Tc2) of the polymer (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc2 of the polymer is greater than about 0° C., or greater than about 5° C., or greater than about 10° C., or greater than about 15° C., or greater than about 20° C. In any embodiment, the Tc2 lower limit of the polymer may be 0° C., 5° C., 10° C., 20° C., 30° C., 40° C., 50° C., 60° C., and 70° C.; and the Tc2 upper limit temperature may be 120° C., 110° C., 100° C., 90° C., 80° C., 70° C., 60° C., 50° C., 40° C., 30° C., 25° C., and 20° C. with ranges from any lower limit to any upper limit being contemplated.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a level of isotacticity expressed as percentage of isotactic triads (three consecutive propylene units), as measured by $^{13}C$ NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Pat. No. 7,232,871.

The semi-crystalline polymer may have a tacticity index m/r ranging from a lower limit of 4, or 6 to an upper limit of 10, or 20, or 25. The tacticity index, expressed herein as "m/r", is determined by $^{13}C$ nuclear magnetic resonance ("NMR"). The tacticity index m/r is calculated as defined by H. N. Cheng in Macromolecules, 17, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature and determined according to ASTM D-792. As used herein, the term "room temperature" is used to refer to the temperature range of about 20° C. to about 23.5° C.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm³, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_O c/\Delta R(\theta, c)] = [1/MP(\theta)] + 2A_2 c$$

where $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_O$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone Bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{kM_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v \equiv (\Sigma c_i M_i^\alpha / \Sigma c_i)^{1/\alpha}$$

In one or more embodiments, the semi-crystalline polymer may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by a viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated.

The polymers that may be used in the adhesive compositions disclosed herein generally include any of the polymers formed as disclosed in WO Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences. Such polymers made in accordance with WO Publication No. 2013/134038, when subjected to Temperature Rising Elution Fractionation, exhibit: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %. The contents of WO Publication No. 2013/134038 and its parent application U.S. Patent Application Ser. No. 61/609,020 filed Mar. 9, 2012, are both incorporated herein in their entirety.

Polymers and blended polymer products are also provided. In any embodiment, one or more of the polymers described herein may be blended with another polymer, such as another polymer described herein, to produce a physical blend of polymers.

Catalysts/Activators

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

In any embodiment, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si—, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3',5'-di-tert-butylphenyl)indenyl) zirconium dimethyl, (dimethylsilyl)bis(2-methyl-4-(3',5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f) indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclo-propylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a —$(CH_2)_a$— group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

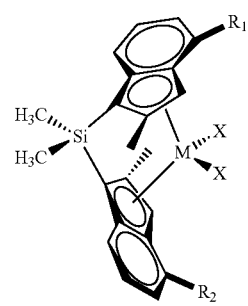

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalyst. A particularly advantageous activator is dimethylaniliniumtetrakis(heptafluoronaphthyl)borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x—Al—O)_n$, which is a cyclic compound, or $R^x(R^x—Al—O)_n AlR^x{}_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Solvents

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

WO Publication No. 2013/134038 generally describes the catalysts, activators, and solvents used to prepare the polymer blend used in the adhesive compositions. The contents of WO Publication No. 2013/134038 and its parent application U.S. Patent Application Ser. No. 61/609,020 filed Mar. 9, 2012, are both incorporated herein in their entirety.

C. Tackifier

The term "tackifer" is used herein to refer to an agent that allows the polymer of the composition to be more adhesive by improving wetting during the application. Tackifiers may be produced from petroleum-derived hydrocarbons and monomers of feedstock including tall oil and other polyterpene or resin sources. Tackifying agents are added to give tack to the adhesive and also to modify viscosity. Tack is required in most adhesive formulations to allow for proper joining of articles prior to the HMA In embodiments, one or more tackifiers may be present in the adhesive compositions in the amount of about 2 to about 40 wt % of the adhesive. In embodiments, other tackifiers may be used with the polymer blends of the invention including, but not limited to, alkylphenolic, coumarone indene, other hydrogenated or non-hydrogenated hydrocarbon resins, hydroxylated polyester resin, phenolic, pure monomer styrene, resin dispersion, rosin ester, rosin, and terpene tackifiers.

D. Additives: Wax, Antioxidant, Nucleating Agent

The HMA composition can include other additives, e.g., waxes, antioxidants, nucleating agents, and combinations thereof, with one or more of tackifiers, as described above.

The term "wax" is used herein to refer to a substance that tweaks the overall viscosity of the adhesive composition. The primary function of wax is to control the set time of the adhesive system. Adhesive compositions of the present invention may comprise paraffin (petroleum) waxes and microcrystalline waxes.

In embodiments, the adhesive compositions may have no wax. In embodiments, other waxes may be used with the polymer blends of the invention including, but not limited to, Castor Oil derivatives (HCO-waxes), ethylene co-terpolymers, Fisher-Tropsch waxes, microcrystalline, paraffin, polyolefin modified, and polyolefin.

The term "antioxidant" is used herein to refer to high molecular weight hindered phenols and multifunctional phenols. A useful commercially available antioxidant is Irganox™ 1010. Irganox 1010 is a hindered phenolic antioxidant available from BASF SE Corporation located in Ludwigshafen, Germany. The invention is not limited to the Irganox 1010 as the antioxidant. In embodiments, the adhesive compositions may have no antioxidant. In embodiments, the adhesive compositions may have from about 0.01 to about 1 wt % of antioxidant.

The term "nucleating agent" as used herein refers to a component that when added to the adhesive composition increases the temperature at which the polyolefin composition begins to solidify or crystallize from a molten state. Without being bound by theory, it is believed that such a component that is compatible with the polyolefin composition forms nucleation sites which promote the alignment and crystallization of the polyolefin polymer molecules adjacent to the nucleation sites. In any embodiment, the nucleating agent may be a solid particle having a size suitable for promoting a nucleating effect. In any embodiment, the nucleating agent may be a polymer that is compatible with the polyolefin and that crystallizes at a higher temperature than the polyolefin to promote a nucleating effect when the adhesive composition cools from a molten state.

A useful commercially available nucleating agent is HYPERFORM™ HPN-20E. The invention is not limited to HPN-20E as the nucleating agent. HPN-20E is a nucleating agent available from Milliken and Company. HPN-20E contains 66% by weight of calcium 1,2-cyclohexanedicarboxylate as a principal component.

In any embodiment, the nucleating agent that can be used in the adhesive composition of the invention is disclosed in WO Publication No. 2013/134038. The contents of WO Publication No. 2013/134038 and its parent application U.S. Patent Application Ser. No. 61/609,020 filed Mar. 9, 2012, are both incorporated herein in their entirety In any embodiment, the nucleating agent may be selected from the group consisting of sodium benzoate, talc, glycerol alkoxide salts, cyclic carboxylic acid salts, bicyclic carboxylic acid salts, glycerolates, and hexahydrophtalic acid salts. Nucleating agents include HYPERFORM™ additives, such as HPN-68, HPN-68L, HPN-20, HPN-20E, MILLAD™ additives (e.g., MILLAD™ 3988) (Milliken Chemicals, Spartanburg, S.C.) and organophosphates such as NA-11 and NA-21 (Amfine Chemicals, Allendale, N.J.). In any embodiment, the nucleating agent may comprise at least one bicyclic carboxylic acid salt. In any embodiment, the nucleating agent is bicycloheptane dicarboxylic acid, disodium salt such as bicyclo[2.2.1]heptane dicarboxylate. In any embodiment, the nucleating agent may be a blend of components comprising bicyclo[2.2.1]heptane dicarboxylate, disodium salt, 13-docosenamide, and amorphous silicon dioxide. In any embodiment, the nucleating agent may be cyclohexanedicarboxylic acid, calcium salt or a blend of cyclohexanedicarboxylic acid, calcium salt, and zinc stearate.

In any embodiment, the nucleating agent may be a metal salt of Formula (I),

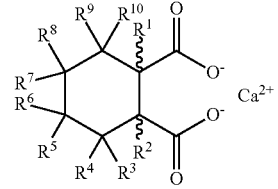

Formula (I)

wherein $R^1$ to $R^{10}$ are independently of one another a hydrogen atom, an alkyl group having 1 to 9 carbon atoms, a hydroxyl group, an alkoxy group having 1 to 9 carbon atoms, an amino group, an alkylamine group having 1 to 9 carbon atoms, a halogen atom, a phenyl group, or a group represented by the formula, R—(R'—O)n-, R being an alkyl group having 1 to 3 carbon atoms, R' being an alkylene group having 2 or 3 carbon atoms, and n being an integer of 1 to 4; any two alkyl groups of $R^1$ to $R^{10}$ may be linked to each other, thereby forming a carbon ring having 3 to 6 carbon atoms; and $R^1$ and $R^2$ have a trans or cis configuration with each other.

Examples of $R^1$ to $R^{10}$ in formula (I) representing the metal salt are a methyl group, an ethyl group, a propyl group, a methoxy group, an ethoxy group, a methylamino group, an ethylamino group, a dimethylamino group, a diethylamino group, a fluorine atom, a chlorine atom, a bromine atom, and an iodine atom. Examples of the group represented by the formula, R—(R'—O) n-, contained in formula (I) are as follows: CH3-(CH2CH2-O)—, CH3(CH2CH2-O) 2-, CH3 (CH2CH2-O)3-, CH3(CH2CH2-O).sub.4-, C2H5-(CH2CH2-O)—, C2H5(CH2CH2-O)2-, C2H5(CH2CH2-O) 3-, C3H7-(CH2CH2-)-, C3H7(CH2CH2-O) 2-, C3H7 (CH2CH2-O)3-, CH3-(CH(CH3)CH2-O)—, CH3(CH (CH3)CH2-O)2-, C2H5-(CH(CH3)CH2-O)—, and C2H5 (CH(CH3)CH2-O)2-.

$R^1$ to $R^{10}$ are independently of one another preferably a hydrogen atom or an alkyl group having 1 to 3 carbon atoms such as a methyl group, an ethyl group and a propyl group. A more preferable metal salt is calcium 1,2-cyclohexanedicarboxylate represented by the following formula:

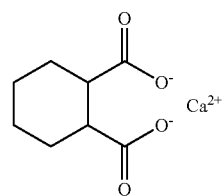 [SMILES: O=C([O-])C1CCCCC1C(=O)[O-] ; [Ca+2]]

In order to improve dispersibility of the metal salt in the adhesive composition of the present invention, the metal salt may be combined with a dispersing agent. Examples of the dispersing agent are an aliphatic acid such as an aliphatic acid having 10 to 24 carbon atoms; an alkyl ester of such an aliphatic acid; an alkali or alkaline-earth metal salt of such an aliphatic acid; alcohols having 10 to 30 carbon atoms; a polyalcohol; and an ester of such a polyalcohol. Among them, preferred is a metal salt of an aliphatic acid.

Examples of the alkali metal are sodium, potassium and lithium, and examples of the alkaline-earth metal are calcium, magnesium and zinc. Examples of the polyalcohol are glycerin, ethylene glycol, propylene glycol, pentaerythritol, dipentaerythritol, tripentaerythritol, and sorbitol.

The metal salt is preferably a particulate form, which has an average particle diameter of usually 0.01 to 10 μm, preferably 0.01 to 5 μm, and further preferably 0.01 to 3 μm, measured with a laser diffraction type-particle size distribution measurement apparatus such as a HELOS™ measurement apparatus (Sympatec GmbH).

Specific Embodiments

The invention may also be understood with relation to the following specific embodiments:

Paragraph A: An adhesive composition comprising: a polymer blend comprising a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. of about 900 cP to about 19,000 cP and wherein, when subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %; and a tackifier having a softening point, as determined by ASTM E-28, of about 85 to about 135° C. and an aromaticity of about 2 to about 12 mol % aromatic protons.

Paragraph B: The adhesive composition of Paragraph A, wherein the tackifier has a softening point, as determined by ASTM E-28, of about 85 to about 125° C.

Paragraph C: The adhesive composition of Paragraph A, wherein the tackifier has a softening point, as determined by ASTM E-28, of about 95 to about 110° C.

Paragraph D: The adhesive composition of Paragraph A, wherein the tackifier has an aromaticity of about 4 to about 12 mol % aromatic protons.

Paragraph E: The adhesive composition of Paragraph A, wherein the tackifier has an aromaticity of about 7 to about 12 mol % aromatic protons.

Paragraph F: The adhesive composition of Paragraph A, wherein the tackifier is present in the amount of less than about 20 wt % of the adhesive composition.

Paragraph G: The adhesive composition of Paragraph A, wherein the tackifier may be a single tackifier or a blend of one or more tackifiers.

Paragraph H: The adhesive composition of Paragraph A, further comprising an antioxidant present in the amount of about 0.01 to about 1 wt % of the adhesive composition.

Paragraph I: The adhesive composition of Paragraph A, further comprising a wax present in the amount of less than about 15 wt % of the adhesive composition.

Paragraph J: The adhesive composition of Paragraph A, further comprising a nucleating agent.

Paragraph K: The adhesive composition of Paragraph J, wherein the nucleating agent is present in an amount of about 200 to about 5000 ppm of the adhesive composition.

Paragraph L: An article comprising the adhesive composition of Paragraph A.

Paragraph M: An article of Paragraph L wherein the adhesive composition adheres two substrates, and wherein each substrate comprises at least one of paper, cardboard, plastic, nonwoven, metal, wood, other natural fiber based material, or combinations thereof.

Paragraph N: An adhesive composition comprising: a polymer blend comprising a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. of about 900 cP to about 19,000 cP; and wherein, when subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %; and a tackifier; wherein the adhesive composition has a viscosity, measured at 177° C. and determined according to ASTM D-3236, from about 350 cP to about 2,000 cP.

Paragraph O: The adhesive composition of Paragraph N, wherein the tackifier is present in the amount of less than about 40 wt % of the adhesive composition.

Paragraph P: The adhesive composition of Paragraph N, wherein the tackifier may be a single tackifier or a blend of one or more tackifiers.

Paragraph Q: The adhesive composition of Paragraph N, wherein the tackifier has a softening point, as determined by ASTM E-28, of about 85 to about 135° C. and an aromaticity of about 2 to about 12 mol % aromatic protons.

Paragraph R: The adhesive composition of Paragraph N, further comprising an antioxidant present in the amount of about 0.01 to 1 wt % of the adhesive composition.

Paragraph S: The adhesive composition of Paragraph N, further comprising a wax present in the amount of less than about 35 wt % of the adhesive composition.

Paragraph T: An article comprising the adhesive composition of Paragraph N.

Paragraph U: An article of Paragraph T wherein the adhesive composition adheres two substrates, and wherein each substrate comprises at least one of paper, cardboard, plastic, nonwoven, metal, wood, other natural fiber based material, or combinations thereof.

Examples

"Fiber tear" describes the bond strength of the adhesive to the substrate and is measured at room temperature, 2° C. (refrigerator temperature), and −18° C. (freezer temperature). Fiber tear is a visual measurement as to the amount of paper substrate fibers that are attached to a bond after the substrates are torn apart. 100% fiber tear means the adhesive is stronger than the substrate and 100% of the adhesive is covered in substrate fibers. Fiber tear is determined by bonding together substrates with the adhesive. A drop of molten adhesive (180° C.) is positioned on one of the substrates. The second substrate is placed on top of the adhesive, and a 500 g weight is placed on top of the second substrate for even application. The adhesive is cooled at the referenced temperature for at least one hour. The substrates are then torn apart and the adhesive is inspected for fiber tear. In the present invention, fiber tear of at least 60% is desired. Preferably, the fiber tear is greater than 90%.

"Set time" is the minimum time interval, after bonding two substrates, during which the cohesive strength of the bond becomes stronger than joint stress. It represents the time necessary to cool down an adhesive composition and obtain a good bond. Set time is determined by bonding together substrates with the adhesive after the molten adhesive (180° C.) has been dropped onto one of the substrates with an eye dropper. The second substrate is placed on top of the adhesive, and a 500 g weight is placed on top of the second substrate for even application. After a predetermined interval of time, the second substrate is removed and checked for fiber tear. If no fiber tear is found, a longer interval of time is tried. This is continued until fiber tear is found. This length of time is reported as the set time in seconds.

"Peel adhesion failure temperature" (PAFT) is defined as the temperature at which the adhesive bond of the composition fails. PAFT of a hot melt adhesive composition is tested according to the standard PAFT test based on ASTM D-4498. PAFT is a critical factor for storing boxes in environments above ambient temperature, such as warehouses. PAFT is measured in ° C. In the present invention, a PAFT of at least 50° C. is desired. Preferably, the PAFT is 55° C. or higher.

"Shear Adhesion Failure Temperature" or "SAFT" is defined as the temperature at which the adhesive bond of the composition fails when the bond is subjected to a stepwise temperature increase under a constant force that pulls the bond in the shear mode. In the present invention, SAFT was measured by the following method. A 12 g sample of HMA was place in a square mold (15 cm×15 cm) 200-micron thick and put between two silicon papers in a press operated at 160° C. The press can be operated by the following procedure: a 7 minute preheating step, a 7 minute degassing step, a 30 second pressurizing step at 100 kN, and a cooling step using plates operated at room temperature for 30 seconds at 100 kN pressure. As used herein, the term "Room Temperature" is used to refer to the temperature range of about 20° C. to about 23.5° C. A 2 cm×2 cm area of HMA cut from the HMA preparation plate was placed on a 2.5 cm×8 cm wood sample in an oven for 5 minutes at 190° C. A 2.2 cm×7 cm strip of wood laminate substrate was placed on top of the molten HMA. To ensure a good adhesion, a 2 kg weight was placed on the bonded area for 1 minute. After a conditioning for 24 hours at 23° C. and 50% Relative Humidity, the test specimens were suspended vertically in an oven at 50° C. with a 1 kg load attached to the bottom and were held for 1 hour. The temperature of the oven was increased by 10° C. during 5-minute intervals, after which the specimen was held for 55 minutes at this temperature. The temperature was gradually increased until the bond failed, at which point the temperature and time were recorded. Generally, the SAFT of the HMA of the present invention ranges from about 70° C. to about 120° C. Preferably, the SAFT is within the range of about 80° C. or 90° C. or 100° C. or 110° C. to less than about 120° C.

"Institute of Packaging Professionals" (IoPP) is defined as a heat stress test (method T-3006) that measures an adhesive's resistance to bond failure at elevated temperatures. The test is described in IoPP Adhesion Committee, IoPP Technical Journal, *Suggested Procedure for Evaluating Hew-Stress Resistance of Hot Melt Adhesives*, Vol. X, No. I, p. 7-9 (Winter 1992). Per the test, if at least 80% of the bonding of the adhesive does not fail, the adhesive is considered to have passing heat resistance at the test temperature.

"Failure Mode" is defined as whether the adhesive bonds or fails when used to adhere a substrate to an inland board. Failure mode is determined at room temperature, 2° C. (refrigerator temperature), and −18° C. (freezer temperature). AF indicates adhesive failure with clean separation of the substrate from the inland board when the substrate is adhered on the hotside of the board. AT indicates adhesive transfer with clean separation of the substrate from the inland board when the substrate is adhered on the coldside of the board. Where the hotside and coldside of the inland board are identical in nature, AT can be reported as AF. FT indicates fiber tear when the adhesive damages the substrate surface. ST indicates substrate tear when the substrate gets torn during test. SF indicates substrate failure or separation of the corrugated. CF indicates cohesive failure when the adhesive splits and residue remains on both the hotside and coldside of the inland board. AB indicates adhesive break when the adhesive cracks with partial adhesive transfer. AB/AF indicates adhesive break plus adhesive failure where the adhesive cracks when the substrate is adhered on the hotside of the board. AB/AT indicates adhesive break plus adhesive transfer where the adhesive cracks when the substrate is adhered on the coldside of the board. CB/AB indicates cohesive or adhesive break where there is a brittle shattering of the adhesive. For CB, the remaining shattered adhesive is on both sides of the board. For AB, the remaining shattered adhesive is on one side. Typically, 5 cardboard specimens are glued together, allowed to cool, pulled apart and the average percent fiber tear is recorded. Where there is more than one mode of failure each mode is listed, e.g., 3AB, 2FT indicates 3 of the 5 specimens had adhesive break while 2 of the 5 specimens showed fiber tear.

"Wax Cloud Point" is the temperature, measured in ° C., below which the adhesive formulation forms a cloudy appearance and no longer displays transparency wax cloud point. Wax Cloud Point is determined by heating adhesive formulations, between 160° C. and 175° C., and recording the temperature at which the transparency of the formulation disappears and the haziness appears.

In a pilot plant, propylene-ethylene copolymers are produced by reacting a feed stream of propylene with a feed stream of ethylene in the presence of a metallocene catalyst. Table 1 shows properties of polymer blends used in the Examples, including Viscosity at 190° C., DSC Crystallinity, Shore Hardness C, Ethylene Content, DSC Melting Point, and Modality. These polymer blends are generally produced in accordance with the method disclosed in WO Publication No. 2013/134038. The adhesive blends presented in the Tables below are prepared by preheating the polymer blend with tackifier and other additives to 180° C. in a glass beaker. The components are blended by manual stirring using a spatula. For examples with polymer blends having melt viscosity above about 12,000 cP, the viscosity of the adhesive composition is measured at 177° C. determined according to ASTM D-3236.

The comparative examples use commercially available premium adhesives expressing low charring, clear, low odor, fast setting, medium viscosity grades of Advantra™ hot melt adhesives used for packaging applications by H. B. Fuller, such as Advantra™ 9256 (Comparative A) and Advantra™ 9250 (Comparative B).

Table 1 lists the polymer blends used in the examples of the invention. The term "Bi-modal" as used in this Table 1 is used to refer to polymers or polymer blends having more than one compositional peak when measured by GPC, DSC, or TREF. Table 1' lists the polymers used as additives in the examples of the invention. The invention is not limited to the polymer blends or polymers disclosed in Table 1 and Table 1'.

Tables 2 and 3 show the formulations of the adhesive compositions having various tackifiers, antioxidants, and waxes. Tables 2 and 3' show the set time, fiber tear, and failure mode of the adhesive compositions of Tables 2 and 3. Tables 2 and 3' also show the aromaticity, in mol % of aromatic protons, and the softening point, in ° C., of each tackifier or blend of tackifiers present in the respective adhesive composition. The following examples of Table 3 and 3' showed good set time and fiber tear values at room temperature: Example 1B, 2B, 3B, 4B, 6B, 7B, 10B, 11B, 13B, 16B, 17B, 23B, 29B, 30B, 32B, 34B, 35B, 36B, and 38B as compared to Comparative A.

Surprisingly, there was found to be a statistically significant correlation between the combination of aromaticity and softening point of tackifiers used with the subject polymer blends in the adhesive formulations and the fiber tear adhesive performance of the adhesive formulations of the invention. The aromaticity and softening point values in Tables 4 and 5' are graphically illustrated in FIG. 1 with respect to fiber tear for the various evaluated adhesive formulations. FIG. 1 shows aromaticity and softening point for fiber tear values below 60%, between 60 and 89%, and greater than or equal to 90%. Tackifiers predominantly having fiber tear values greater than 60%, illustrated by the largest, outermost rectangular box 10, had aromaticity between about 2 to 12 mol % aromatic protons and softening point between about 85 to 135° C. Eighty-eight percent (88%) of the evaluated adhesive formulations having tackifiers in these aromaticity and softening point ranges demonstrated at least 60% fiber tear, and sixty-four percent (64%) demonstrated at least 90% fiber tear, whereas ninety-one percent (91%) of the evaluated adhesive formulations utilizing tackifiers having an aromaticity or a softening point out of these ranges demonstrated fiber tear of less than 60% and one hundred percent (100%) demonstrated fiber tear of less than 90%. These results indicate a statistically significant performance advantage for using tackifiers with an aromaticity between about 2 to 12 mol % aromatic protons and softening point between about 85 and 135° C. when these tackifiers are employed with the subject polymers in adhesive formulations.

Even greater performance advantage was observed for tackifiers having an aromaticity between about 4 to 12 mol % aromatic protons and softening point between about 85 to 125° C., as indicated by the middle rectangular box 12. One hundred percent (100%) of the evaluated adhesive formulations comprising tackifiers having an aromaticity and softening point in these ranges demonstrated at least 60% fiber tear and seventy-seven percent (77%) of the evaluated adhesive formulations demonstrated at least 90% fiber tear when the tackifiers were employed with the subject polymers in adhesive formulations.

Superior performance advantage was noted for tackifiers having an aromaticity between about 7 to 12 mol % aromatic protons and softening point between about 95 to 110° C., as indicated by the smallest, innermost rectangular box 14. One hundred percent (100%) of the adhesive formulations comprising tackifiers having aromaticity and softening point in these ranges demonstrated at least 90% fiber tear when employed with the subject polymers in adhesive formulations. The invention is not limited to adhesive formulations having a fiber tear of over 60% or to applications requiring a certain fiber tear, such as non-packaging applications.

Table 4 shows the set time, fiber tear, and failure mode of adhesives using a single tackifier, antioxidant, and wax. Example 1C having Escorez™ 5690 had equivalent fiber tear and set time to Comparative A. Examples 2C-7C without Escorez™ 5690 showed less favorable properties than Comparative A.

Tables 5 and 5' show adhesive compositions that exhibit superior adhesion at room temperature and at −18° C. In these compositions, Escorez™ 5615, 5340, and 5600 all had a set time equivalent to Comparative B, but with good low temperature performance even after aging for 7 days. Surprisingly, Example 6D of Table 5 having blended Escorez™ 5340 and 5615 (with blended aromaticity of 5 mol % aromatic protons and blended softening point of 130° C.) showed superior properties to Examples 1D-4D having Escorez™ 5637 (with aromaticity of 6 mol % aromatic protons and softening point of 130° C.). Unlike the tackifiers of the compositions of Tables 2, 2', 3, and 3' which per FIG. 1 showed a correlation of aromaticity and softening point with respect to fiber tear, the tackifiers of the compositions of Table 5 do not show such a trend. Example 12D of Table 5 is a preferred embodiment having superior fiber tear and set time (at room temperature, −18° C., and after 7 days of aging). Table 5' shows the viscosities of the final adhesive compositions. Tables 5 and 5' also show that the addition of AC™-596P results in a favorably higher fiber tear of the resulting adhesive composition.

Tables 6 and 6' show a series of adhesive compositions, each comprising a different base polymer blend (Polymer Blend D through Polymer Blend J). In all examples, low temperature properties even after aging are superior. However, set time was slower than Comparative B.

Table 7 compares the adhesive composition made using a polymer blend as per the invention with an adhesive composition that is made using a competitive polymer, L-Modu™ S400 as well as Comparative B. L-Modu™ S400 is a low molecular weight and low modulus polyolefin commercially available from Idemitsu. The properties of L-modu S400 are provided in Table 1. Adhesive compositions comprising the competitive polymer exhibited inferior fiber tear and set time properties as compared to compositions comprising Polymer Blend C.

Table 8 shows properties of adhesive compositions with one or more tackifiers, waxes, and a nucleating agent.

Table 9 shows the peel adhesion failure temperature (PAFT) of the adhesive composition, in addition to fiber tear and set time, for adhesive compositions with Escorez 5690. Adhesive formulations using Escorez™ 5690 (Examples 1H-12H) had improved PAFT, of at least 50° C., but at the expense of set time.

Table 10 shows properties of adhesive compositions with Sylvares™ TP 2040. The maximum passing heat stress resistance temperature was recorded for each example (recorded as IoPP). The compositions having above 2 wt % Sylvares™ TP 2040 have improved PAFT and IoPP without compromising set time values in comparison to compositions having Escorez 5690, where improved PAFT and IoPP had increased set time.

Table 11 shows set time and PAFT of adhesive compositions having a binary blend of a polymer and a tackifier. As none of the examples in Table 11 have wax, the set time was measured as the onset of tearing of the fiber. Four PAFT measurements were taken for each example and the average and standard deviation for each example was recorded. Generally, tackifiers with higher aromaticity, over 10 mol % aromatic protons, and higher softening point, over 118° C., exhibit higher PAFT values without compromising set time.

Table 12 shows the level of transparency of the adhesive formulation having a tackifier and a polymer blend. "0" indicates the formulation was always hazy and never showed any level of transparency. "1" indicates the formulation was transparent at temperatures until the wax cloud point, and became hazy at temperatures below the Wax Cloud Point. "2" indicates the formulation was semi-transparent at all temperatures. "3" indicates the formulation was transparent at all temperatures.

Table 13 shows fiber tear values of adhesive formulations having one or more polymer blends, tackifiers, and waxes, as compared to Comparative B.

Tables 14 and 14' show fiber tear, set time, and viscosities of adhesive formulations having one or more polymer blends, tackifiers, and waxes, as compared to Comparative B.

Table 15 shows fiber tear and set time of adhesive formulations having one or more polymer blends, tackifiers, and waxes, as compared to Comparative B.

Tables 16 and 16' show fiber tear, set time, and viscosities of adhesive formulations have one or more polymer blends, tackifiers, and waxes, as compared to Comparative B.

Table 17 shows fiber tear, set time, and viscosities of adhesive formulations having one or more polymer blends, tackifiers, and waxes, as compared to Comparative B. Adhesive formulations of Table 15 and Table 17 vary only in the polymer blends.

Table 18 shows PAFT, SAFT, fiber tear, set time, and viscosities of adhesive formulations having a polymer blend, one or more tackifiers, and polymer additives.

Table 19 shows the fiber tear of adhesive formulations having a polymer blend, wax, one or more tackifiers, and polymer additives.

TABLE 1

| Polymer Blend | Viscosity at 190° C., cP | DSC Crystallinity, dH J/g | Shore Hardness C | Ethylene Content, % | DSC Melting Point, ° C. | Bi-modal |
|---|---|---|---|---|---|---|
| A | 1,135 | 46.55 | 53 | 7.25 | 46.55 | yes |
| B | 14,770 | 34.8 | | | 87.3 | yes |
| C | 10,910 | 32.6 | | | 87.1 | yes |
| D | 16,850 | 17.13 | 42 | 10.3 | 60.4 | no |
| E | 18,900 | 20.52 | 27 | 15.3 | | yes |
| F | 12,100 | 19.0 | 24 | 16.13 | 68.57 | yes |
| G | 11,350 | 16.35 | 23 | 16.01 | 69.52 | yes |
| H | 3,780 | 15.24 | 15 | 16.8 | 69.72 | yes |
| I | 12,120 | 19.85 | 15 | 13.5 | 60.51 | yes |
| J | 12,470 | 19.93 | 16 | 11.14 | 64.65 | yes |
| K | 1,150 | 45.4 | | 3.81 | 88.4 | no |
| L | 1,235 | | | 6.5 | | |
| M | 1,275 | | | 5.9 | | |
| N | 1,115 | 42 | 50 | 6.8 | 106 | |
| O | 20 (Melt Flow Rate, g/10 min) | 16.23 | 66 (Shore Hardness A) | 15 | 105.97 | yes |
| P | 200 (Melt Flow Rate, g/10 min) | 20.1 | 72 | 13.5 | 161.56 | yes |
| Q | 1,000 | 43 | | | 126 | yes |
| R | 1,005 | 41.1 | | 3.87 | | no |
| S | 960 | 36.9 | | 11.3 | 110.9 | yes |
| T | 1,370 | 41.7 | 45 | 5.8 | 96 | yes |
| U | 8,000 | 23.1 | 21 | 12.4 | 100.7 | yes |
| L-modu ™ S400 | 9,000 | 23.34 | | | 56.31 | |
| Affinity ™ GA 1900 | 8.20 (Pa-s at 177° C.) | | | | 68 | |

TABLE 1

| Polymer | Description | Source |
|---|---|---|
| UL ™ 7720 | Ethylene vinyl acetate copolymer having Melt Index of 150 g/10 min, Shore Hardness A of 72. | ExxonMobil Chemical |
| UL ™ 7710 | Ethylene vinyl acetate copolymer having Melt Index of 420 g/10 min, Shore Hardness A of 60. | ExxonMobil Chemical |
| A-C ™ 596P | Maleated polypropylene having Drop Point of 141° C., Hardness of <0.5 dmm, Density of 0.93 g/cm$^3$, Viscosity of 150 at 190° C. | Honeywell |
| A-C ™ 1089 | Polypropylene homopolymer having Drop Point of 146° C., Hardness <0.5 dmm, Viscosity of 45 at 190° C. | Honeywell |
| A-C ™ 1660 | Polypropylene homopolymer having Drop Point of 150° C., Hardness <0.5 dmm, Viscosity of 60 at 190° C. | Honeywell |
| Escorene ™ MV 02514 | Ethylene vinyl acetate copolymer resin having Shore Hardness A of 84, Density of 0.924 g/cm$^3$, Viscosity of 3100 mPa-s at 190° C.. | ExxonMobil Chemical |

TABLE 1-continued

| Polymer | Description | Source |
|---|---|---|
| Achieve ™ 6936G1 | Ultra-high melt flow rate polypropylene with Melt Flow Rate of 1550 g/10 min. | ExxonMobil Chemical |
| INFUSE ™ 9807 | Olefin block copolymer having Melt Index of 15 g/10 min, Density of 0.866 g/cm³, DSC Melting Point of 118° C. | Dow Chemical |
| INFUSE ™ 9817 | Olefin block copolymer having Melt Index of 15 g/10 min, Density of 0.877 g/cm³, DSC Melting Point of 120° C. | Dow Chemical |

TABLE 2

|  | 1A | 2A | 3A | 4A | 5A | 6A | 7A | 8A | 9A | 10A | 11A | 12A | Comparative |
|---|---|---|---|---|---|---|---|---|---|---|---|---|---|
| Adhesive Components, wt % | | | | | | | | | | | | | |
| Polymer Blend A | 84.5 | 84.5 | 84.5 | 84.5 | 84.5 | 84.5 | 84.5 | 84.5 | 84.5 | 84.5 | 84.5 | 79.5 | Comparative A |
| POLYWAX ™ 2000 | 7.5 | 7.5 | 7.5 | 7.5 | 7.5 | 7.5 | 7.5 | 7.5 | 7.5 | 4.5 | 7.5 | 7.5 | |
| Regalite ™ R1100 | 7.5 | | | | | | | | | | | | |
| Arkon ™ M-135 | | 7.5 | | | | | | | | | | | |
| Sukorez ™ SU 90 | | | 7.5 | | | | | | | | | | |
| Sukorez ™ SU 200 | | | | 7.5 | | | | | | | | | |
| Eastotac ™H-130 R | | | | | 7.5 | | | | | | | | |
| Regalite ™ S5100 | | | | | | 7.5 | | | | | | | |
| Escorez ™ 2393 | | | | | | | 7.5 | | | | | | |
| ECR ™ 186 | | | | | | | | 7.5 | | | | | |
| ECR ™ 149B | | | | | | | | | 7.5 | | | | |
| Escorez ™ 5690 | | | | | | | | | | 7.5 | 4.5 | 5 | |
| Escorez ™ 2520 | | | | | | | | | | 3.0 | 3.0 | 7.5 | |
| Irganox ™ 1010 | 0.5 | 0.5 | 0.5 | 0.5 | 0.5 | 0.5 | 0.5 | 0.5 | 0.5 | 0.5 | 0.5 | 0.5 | |
| Physical Testing | | | | | | | | | | | | | |
| Set Time (seconds) | 1 | 1 | 1-1.5 | 1-1.5 | 1.5 | 1-1.5 | 1-1.5 | 1 | 1-1.5 | 1.5-2 | 1-1.5 | 1-1.5 | 1.5 |
| % Fiber Tear, Room Temperature | 0 | 0 | 0 | 0 | 0 | 22 | 0 | 14 | 12 | 78 | 0 | 60 | 78 |
| Failure Mode | AB | AB | AB | AB | AB | AB | AB | AB | AB | AB | AB | AB | FT |
| % Fiber Tear, −18° C. | 0 | 0 | 0 | 0 | 0 | 0 | 0 | 0 | 0 | 0 | 0 | 0 | 19 |
| Failure Mode | AB | AB | AB | AB | AB | AB | AB | AB | AB | AB | AB | AB | AB |
| Tackifier Aromaticity (mol % aromatic protons) | 2 | 7.3 | 0.13 | 2 | 0.3 | 13 | | 15 | | 9.4 | 7.4 | 14 | |
| Tackifier Softening Point (° C.) | 100 | 135 | 90 | 103 | 130 | 100 | 90 | 93 | 105 | 48 | 40 | 31 | |

TABLE 3

| Adhesive Components, wt % | 1B | 2B | 3B | 4B | 5B | 6B | 7B | 8B | 9B | 10B | 11B | 12B |
|---|---|---|---|---|---|---|---|---|---|---|---|---|
| Polymer Blend A | 79.5 | 79.5 | 79.5 | 79.5 | 79.5 | 79.5 | 79.5 | 79.5 | 79.5 | 79.5 | 79.5 | 79.5 |
| POLYWAX ™ 2000 | 5 | 5 | 5 | 5 | 5 | 5 | 5 | 5 | 5 | 5 | 5 | 5 |
| POLYWAX ™ 3000 | | | | | | | | | | | | |
| Escorez ™ 5690 | 7.5 | 10.5 | 13 | 14.5 | 7.5 | 13 | 14 | 4 | 7.5 | 13 | | |
| Escorez ™ 5380 | 7.5 | 4.5 | 2 | 0.5 | | | | | | | | |
| Escorez ™ 5400 | | | | | 7.5 | 2 | 1 | 11 | 7.5 | 2 | 1 | 11 |
| Escorez ™ 5415 | | | | | | | | | | | | |
| Escorez ™ 5637 | | | | | | | | | | | | |
| PR ™ 100N | | | | | | | | | | | | |
| Escorez ™ 2520 | | | | | | | | | | | | |
| Escorez ™ 5600 | | | | | | | | | | | 14 | 4 |
| Irganox ™ 1010 | 0.5 | 0.5 | 0.5 | 0.5 | 0.5 | 0.5 | 0.5 | 0.5 | 0.5 | 0.5 | 0.5 | 0.5 |

| Adhesive Components, wt % | | | | | | | | | 19B | 20B | 21B | 22B |
|---|---|---|---|---|---|---|---|---|---|---|---|---|
| Polymer Blend A | 79.5 | 79.5 | 79.5 | 79.5 | 79.5 | 79.5 | 79.5 | 79.5 | 79.5 | 79.5 | | |
| POLYWAX ™ 2000 | 5 | 5 | 5 | 5 | 5 | 5 | 5 | 5 | 5 | 5 | | |
| POLYWAX ™ 3000 | | | | | | | | | | | | |
| Escorez ™ 5690 | | | | | | | | | 9.5 | 14 | 6 | |
| Escorez ™ 5380 | | | | | | | | | | | | |

TABLE 3-continued

| Component | | | | | | | | | | | | |
|---|---|---|---|---|---|---|---|---|---|---|---|---|
| Escorez ™ 5400 | 0.5 | | | | | | | | | | | |
| Escorez ™ 5415 | | 5.5 | 12 | 7.5 | 0.5 | 9.5 | 5.5 | 1 | 9 | 5.5 | | |
| Escorez ™ 5637 | | | | | | | | | | | 9.5 | |
| PR ™ 100N | | | | | | | | | | | | |
| Escorez ™ 2520 | | | | | | | | | | | | |
| Escorez ™ 5600 | 14.5 | 9.5 | 3 | 7.5 | 14.5 | 5.5 | | | | | | |
| Irganox ™ 1010 | 0.5 | 0.5 | 0.5 | 0.5 | 0.5 | 0.5 | 0.5 | 0.5 | 0.5 | 0.5 | | |

Adhesive Components, wt %

| Component | | | | | | | | | | | | |
|---|---|---|---|---|---|---|---|---|---|---|---|---|
| Polymer Blend A | 79.5 | 79.5 | 79.5 | 79.5 | 79.5 | 79.5 | 79.5 | 79.5 | 79.5 | 79.5 | 79.5 | 79.5 |
| POLYWAX ™ 2000 | 5 | 5 | 5 | 5 | 5 | 5 | 5 | 5 | 5 | 5 | 5 | 5 |
| POLYWAX ™ 3000 | | | | | | | | | | | | |
| Escorez ™ 5690 | | | 5.5 | 7.5 | 3 | 12 | 9 | | | | | |
| Escorez ™ 5380 | | | | | | | | | | | | |
| Escorez ™ 5400 | | | | | | | | | | | | |
| Escorez ™ 5415 | 0.5 | 12 | 1 | | | | | | | | | |
| Escorez ™ 5637 | 14.5 | 3 | 14 | 9.5 | 7.5 | 12 | 3 | 6 | 14 | 11 | 4 | 12 |
| PR ™ 100N | | | | | | | | | 1 | 4 | 11 | 3 |
| Escorez ™ 2520 | | | | | | | | | | | | |
| Escorez ™ 5600 | | | | | | | | | | | | |
| Irganox ™ 1010 | 0.5 | 0.5 | 0.5 | 0.5 | 0.5 | 0.5 | 0.5 | 0.5 | 0.5 | 0.5 | 0.5 | 0.5 |

Adhesive Components, wt % — Comparative

| Component | | | | | | | | | | |
|---|---|---|---|---|---|---|---|---|---|---|
| Polymer Blend A | 79.5 | 79.5 | 79.5 | 79.5 | 79.5 | 79.5 | 79.5 | 79.5 | 79.5 | Comparative A |
| POLYWAX ™ 2000 | 5 | 5 | 5 | 5 | 5 | 5 | 5 | 5 | 5 | |
| POLYWAX ™ 3000 | | | | | | | | | | |
| Escorez ™ 5690 | 13 | 7.5 | 2 | 4 | 3 | | | | | |
| Escorez ™ 5380 | | | | | | | | | | |
| Escorez ™ 5400 | | | | | | | | | | |
| Escorez ™ 5415 | | | | | | | | | | |
| Escorez ™ 5637 | | | | | | | | | | |
| PR ™ 100N | 2 | 7.5 | 13 | 11 | 12 | 4.5 | 2 | 0.5 | 1 | |
| Escorez ™ 2520 | | | | | | 10.5 | 13 | 14.5 | 14 | |
| Escorez ™ 5600 | | | | | | | | | | |
| Irganox ™ 1010 | 0.5 | 0.5 | 0.5 | 0.5 | 0.5 | 0.5 | 0.5 | 0.5 | 0.5 | |

TABLE 3'

| Physical Testing | 1B | 2B | 3B | 4B | 5B | 6B | 7B | 8B | 9B |
|---|---|---|---|---|---|---|---|---|---|
| Set Time (seconds) | 1.5 | 1.5 | 1.5 | 1.5 | 1-1.5 | 1.5 | 1.5 | 1-1.5 | 1-1.5 |
| % Fiber Tear, Room Temperature | 100 | 93 | 91 | 98 | 86 | 90 | 89 | 34 | 0 |
| Failure Mode | FT | FT | FT | FT | FT | FT | AB; FT | 3AB; 2FT | AB |
| % Fiber Tear, −18° C. | 0 | 0 | 10 | 0 | 0 | 0 | 0 | 0 | 0 |
| Failure Mode | AB | AB | 2AB; 3FT | AB | 2AB; 3AF | AF | 3AB; 2AF | AF | AB |
| Tackifier Aromaticity (mol % aromatic protons) | 5.1 | 7 | 8.7 | 9.7 | 5.1 | 8.7 | 9.3 | 2.7 | |
| Tackifier Softening Point (° C.) | 88 | 88.8 | 89.4 | 89.9 | 96.1 | 91.5 | 90.8 | 99.2 | 95 |

| Physical Testing | | | | | | | | | |
|---|---|---|---|---|---|---|---|---|---|
| Set Time (seconds) | 1.5 | 1-1.5 | 1-1.5 | 1.5 | 1.5 | 1-1.5 | 1-1.5 | 1.5 | 1-1.5 |
| % Fiber Tear, Room Temperature | 90 | 95 | 61 | 97 | 79 | 43 | 95 | 95 | 13 | 92 |
| Failure Mode | FT | FT | FT | FT | FT | 3AB; 2FT | 2AB; 3FT | FT | AB | FT |
| % Fiber Tear, −18° C. | 0 | 0 | 0 | 0 | 1 | 2 | 0 | 0 | 0 | 0 |
| Failure Mode | AB | AB | 2AB; 3AF | 2AB; 3AF | 2AB; 2AF; FT | 4AB; FT | 2AB; 3AF | 2AB; 3AF | 2AB; 3AF | 4AF; 1AB |
| Tackifier Aromaticity (mol % aromatic protons) | | 10.3 | 3 | 10.6 | 7 | 2.3 | 5.6 | 10.6 | 4.1 | 6.4 |
| Tackifier Softening Point (° C.) | | 103 | 103 | 103 | 108 | 114.7 | 110 | 103.4 | 112 | 98.6 |

TABLE 3'-continued

| Physical Testing | | | | | | | | | | |
|---|---|---|---|---|---|---|---|---|---|---|
| Set Time (seconds) | 1.5 | 1.5 | 1.5-2 | 1-1.5 | 1 | 1-1.5 | 1.5 | 1.5 | 1.5 | 1.5 |
| % Fiber Tear, Room Temperature | 77 | 68 | 56 | 98 | 59 | 0 | 84 | 90 | 85 | 92 |
| Failure Mode | FT | FT | 1AB; 4FT | FT | 1AB; 4FT | AB | FT | FT | FT | FT |
| % Fiber Tear, −18° C. | 6 | 0 | 0 | 0 | 0 | 0 | 0 | 5 | 9 | 0 |
| Failure Mode | AB | AB | AB | AB | AB | AB | AB | FT; 4AF | 2FT; 3AB | 3AB; 2AF |
| Tackifier Aromaticity (mol % aromatic protons) | 9.3 | 4.1 | 3.8 | 5.8 | 1.3 | 5.6 | 7.5 | 8 | 6.8 | 9.2 |
| Tackifier Softening Point (° C.) | 91.4 | 104.9 | 125.3 | 129.6 | 120.2 | 129.1 | 111.8 | 106.4 | 119.4 | 95.9 |

| Physical Testing | | | | | | | | |
|---|---|---|---|---|---|---|---|---|
| Set Time relative to Comparative (seconds) | 1.5 | 1 | 1 | 1-1.5 | 1 | 1.5 | 1.5 | 1.5 |
| % Fiber Tear, Room Temperature | 100 | 76 | 100 | 31 | 95 | 98 | 96 | 85 |
| Failure Mode | FT | FT | FT | 2FT; 2 AB; AF | FT | FT | FT | 4FT; 1AB |
| % Fiber Tear, −18° C. | 0 | 0 | 1 | 0 | 0 | 0 | 1 | 0 |
| Failure Mode | AB | AB | AF; AB | AB; AF | AB; AF | AF | AB; AF | AB |
| Tackifier Aromaticity (mol % aromatic protons) | 8.4 | 5.6 | 4.4 | 1.7 | 4.8 | 8.7 | 5.1 | 1.4 |
| Tackifier Softening Point (° C.) | 102.6 | 130.6 | 132.5 | 137.2 | 131.9 | 94.5 | 109.6 | 130.3 |

| Physical Testing | | | | | | Comparative |
|---|---|---|---|---|---|---|
| Set Time relative to Comparative (seconds) | 1-1.5 | 1.5 | 1-1.5 | 1-1.5 | 1.5 | 1 |
| % Fiber Tear, Room Temperature | 99 | 35 | 0 | 0 | 0 | 0 |
| Failure Mode | FT | FT; 2AB | AF | AF | 2AF3 AB | AF |
| % Fiber Tear, −18° C. | 0 | 0 | 0 | 0 | 0 | 0 |
| Failure Mode | AF | AB | AF | AF | AB | AB |
| Tackifier Aromaticity (mol % aromatic protons) | 2.7 | 2.1 | 15.4 | 19.1 | 21.3 | 20.5 |
| Tackifier Softening Point (° C.) | 121.9 | 126 | 29.4 | 24.8 | 22.6 | 23.3 |

TABLE 4

| | 1C | 2C | 3C | 4C | 5C | 6C | 7C | Comparative |
|---|---|---|---|---|---|---|---|---|
| Adhesive Components, wt % | | | | | | | | |
| Polymer Blend A | 85 | 85 | 85 | 85 | 85 | 85 | 85 | Comparative A |
| POLYWAX ™ 2000 | 7.5 | 7.5 | 7.5 | 7.5 | 7.5 | 7.5 | 7.5 | |
| Escorez ™ 5690 | 7.5 | | | | | | | |
| Eastotac ™ H-130R | | 7.5 | | | | | | |
| Sukorez ™ SU-130 | | | 7.5 | | | | | |
| Regalite ™ R1125 | | | | 7.5 | | | | |
| Arkon ™ P-140 | | | | | 7.5 | | | |
| Fuclear ™ FP-125 | | | | | | 7.5 | | |
| I-MARV ™ P-125 | | | | | | | 7.5 | |
| Irganox ™ 1010 | 0.5 | 0.5 | 0.5 | 0.5 | 0.5 | 0.5 | 0.5 | |
| Physical Testing | | | | | | | | |
| % Fiber Tear, Room Temp. | 74 | 0 | 0 | 5 | 0 | 0 | 0 | 78 |
| Failure Mode | FT | AF | CB | 3CB; 2FT | AF | AF | AF; CB | FT |
| % Fiber Tear, −18° C. | 0 | 0 | 0 | 0 | 0 | 0 | 0 | 19 |
| Failure Mode | AF | AF | CB | AF | AF | AF | AF; CB | AB |

TABLE 4-continued

|  | 1C | 2C | 3C | 4C | 5C | 6C | 7C | Comparative |
|---|---|---|---|---|---|---|---|---|
| Set time (seconds) | 1.5 | 2 | 1.5-2 | 1.5 | 1 | 1-1.5 | 1.5 | 1.5 |
| Tackifier Aromaticity (mol % aromatic protons) | 10 | 0.26 | 0.1 | 1.6 | 0 | 4.5 | 1 |  |
| Tackifier Softening Point (° C.) | 90 | 130 | 130 | 123 | 140 | 125 | 125 |  |

TABLE 5

| Adhesive Components, wt % | 1D | 2D | 3D | 4D | 5D | 6D | 7D | 8D | 9D | 10D | 11D | 12D | Comparative |
|---|---|---|---|---|---|---|---|---|---|---|---|---|---|
| Polymer Blend B | 30.5 | 30.5 | 30.5 | 30.5 | 30.5 | 30.5 | 30.5 | 30.5 | 30.5 | 30.5 | 30.5 | 30.5 | Comparative B |
| Irganox ™ 1010 | 0.75 | 0.75 | 0.75 | 0.75 | 0.75 | 0.75 | 0.75 | 0.75 | 0.75 | 0.75 | 0.75 | 0.75 |  |
| AC ™596P | 3.75 |  | 1.5 | 3.75 | 3.75 | 3.75 | 3.75 | 3.75 | 3.75 |  |  | 3.75 |  |
| AC ™9 | 35 | 35 | 35 | 35 | 35 | 35 | 35 | 35 | 35 | 35 | 35 | 35 |  |
| Escorez ™ 5400 |  |  |  |  |  |  |  | 30 |  |  |  |  |  |
| Escorez ™ 5415 |  |  |  |  |  |  | 30 |  |  |  |  |  |  |
| Escorez ™ 5340 |  |  |  |  | 15 |  |  |  | 30 |  | 33.75 |  |  |
| Escorez ™ 5600 |  |  |  |  |  |  |  |  |  |  |  | 30 |  |
| Escorez ™ 5615 |  |  |  | 30 | 15 |  |  |  |  | 33.75 |  |  |  |
| Escorez ™ 5637 | 30 | 33.75 | 32.25 | 30 |  |  |  |  |  |  |  |  |  |

TABLE 5'

| Physical Testing | 1D | 2D | 3D | 4D | 5D | 6D | 7D | 8D | 9D | 10D | 11D | 12D | Comparative |
|---|---|---|---|---|---|---|---|---|---|---|---|---|---|
| Viscosity at 177° C., cP | 1,087 | 1,017 | 1,252 | 1,095 | 1,157 | 1,290 | 1,090 | 1,260 | 1,197 | 1,077 | 1,407 | 1,230 | 1,045 |
| % Fiber Tear, Room Temp. | 68 | 0 | 93 | 94 | 89 | 98 | 99 | 97 | 97 | 0 | 14 | 98 | 82 |
| Failure Mode | AF;AB; 2CF | CF | AF | AF | AF; CF | AF | AF | AF | AF | CF | CF | AF | AF |
| % Fiber Tear, 2° C. | 9 | 0 | 67 | 55 | 91 | 94 | 93 | 100 | 82 | 0 | 0 | 89 | 82 |
| Failure Mode | CF | CF | CF; AF | CF; 2AF | AF; CF | AF | AF | AF | AF | CF | CF | CF | AF |
| % Fiber Tear, -18° C. | 10 | 0 | 18 | 14 | 78 | 92 | 60 | 82 | 87 | 0 | 0 | 90 | 73 |
| Failure Mode | CF | CF | CF | CF | CF; AF | AF | AF; CF | AF; CF | AF; CF | CF | CF | AF; CF | AF; CF |
| Set time relative to Comparative | Slightly Same | Slower | Same | Same | Same | Slightly Same | Slower | Same | Slower | Slower | Slower | Slightly Same | 1.5-2 seconds |
| Aging Study for 7 days |  |  |  |  |  |  |  |  |  |  |  |  |  |
| % Fiber Tear , 2° C. | 90 | 0 | 37 | 75 | 96 | 90 | 56 | 96 | 96 | 0 | 0 | 97 | 94 |
| Failure Mode | AF | CF | CF | AF; CF | AF | AF | AF | AF | AF | CF | CF | AF | AF |
| % Fiber Tear, -18° C. |  | 0 | 24 | 0 | 72 | 31 | 0 | 0 | 70 | 0 | 0 | 95 | 87 |
| Failure Mode |  | CF | CF | CF | AF | CF | CF | CF | AF; CF | CF | CF | AF | AF |

TABLE 6

| Adhesive Components, wt % | 1E | 2E | 3E | 4E | 5E | 6E | 7E | Comparative |
|---|---|---|---|---|---|---|---|---|
| Polymer Blend D |  |  |  |  | 35.5 |  |  | Comparative B |
| Polymer Blend E | 35.5 |  |  |  |  |  |  |  |
| Polymer Blend F |  | 35.5 |  |  |  |  |  |  |
| Polymer Blend G |  |  | 35.5 |  |  |  |  |  |
| Polymer Blend H |  |  |  | 35.5 |  |  |  |  |
| Polymer Blend I |  |  |  |  |  | 35.5 |  |  |
| Polymer Blend J |  |  |  |  |  |  | 35.5 |  |
| Escorez ™ 5400 | 30 | 30 | 30 | 30 | 30 | 30 | 30 |  |
| AC ™596P | 3.75 | 3.75 | 3.75 | 3.75 | 3.75 | 3.75 | 3.75 |  |
| AC ™9 | 30 | 30 | 30 | 30 | 30 | 30 | 30 |  |
| Irganox ™ 1010 | 0.75 | 0.75 | 0.75 | 0.75 | 0.75 | 0.75 | 0.75 |  |

TABLE 6'

| Physical Testing | 1E | 2E | 3E | 4E | 5E | 6E | 7E | Comparative |
|---|---|---|---|---|---|---|---|---|
| Viscosity at 177° C., cP | 1,962 | 1,420 | 1,152 | 1,347 | 1,965 | | | 825 |
| % Fiber Tear, Room Temperature | 98 | 100 | 100 | 100 | 98 | | | 98 |
| Failure Mode | AB; 2AF | AF | AF | AF | AF | | | AF |
| % Fiber Tear, 2° C. | 98 | 100 | 100 | 99 | 92 | | | 87 |
| Failure Mode | 1CF; 1AB; 1AF | 1AB; 2AF | AF | AF | AF | | | AF;CF |
| % Fiber Tear, −18° C. | 92 | 98 | 94 | 83 | 90 | | | 31 |
| Failure Mode | 1CF; 1AB; 1AF | 1AB; AAF | 1CF; AF | 1CF; AF | AF | | | 2CF; AF |
| Set time relative to Comparative | Slightly Slower | Slower | Slower | Slower | Slightly Slower | | | |
| Set Time (seconds) | 2 | 3-3.5 | 2-2.5 | 2-2.5 | 2 | | | 1.5-1.75 |
| Aging Study for 6 weeks | | | | | | | | |
| % Fiber Tear, 2° C. | 100 | 100 | 100 | 100 | 98 | | | 30 |
| Failure Mode | AF | AF | AF | AF | AF | | | AF; CF |
| % Fiber Tear, −18° C. | 90 | 99 | 92 | 98 | 97 | | | 0 |
| Failure Mode | AF | AF | 2AF; 1CF | AF | AF | | | 1CF; 2AF |

TABLE 7

| | 1F | 2F | 3F | 4F | Comparative |
|---|---|---|---|---|---|
| Adhesive Components, wt % | | | | | |
| Polymer Blend C | | 30.5 | | 35.5 | Comparative B |
| L-modu ™ S400 | 30.5 | | 35.5 | | |
| Irganox ™ 1010 | 0.75 | 0.75 | 0.75 | 0.75 | |
| AC ™596P | 3.75 | 3.75 | 3.75 | 3.75 | |
| AC ™9 | 35 | 35 | | | |
| POLYWAX ™ 3000 | | | 30 | 30 | |
| Escorez ™ 5637 | 30 | 30 | 30 | 30 | |
| Physical Testing | | | | | |
| Viscosity at 177° C., cP | 878 | 1,060 | 850 | 1,120 | |
| % Fiber Tear, Room Temperature | 30 | 100 | 80 | 93 | 97 |
| Failure Mode | CF | AF | AF | AF | AF |
| % Fiber Tear, 2° C. | 0 | 97 | 18 | 80 | 95 |
| Failure Mode | CF | 3CF; 2AF | CF | 2CF; 3AF | AF; CF |
| % Fiber Tear, −18° C. | 0 | 95 | 0 | 18 | 49 |
| Failure Mode | CF | AF | CF | CF; AF | AF; CF |
| Set time relative to Comparative | Slower | Same | Slower | Slightly Faster | 1.5-2 seconds |

TABLE 8

| | 1G | 2G | 3G | 4G | 5G | 6G | 6'G | 7G | 8G | 9G |
|---|---|---|---|---|---|---|---|---|---|---|
| Adhesive Components, wt % | | | | | | | | | | |
| Polymer Blend K | 95 | 96 | 97 | 98 | 98 | 95 | 95 | 95 | 90 | 90 |
| HPN-20E ™, ppm | 600 | 600 | 600 | 600 | | 600 | 600 | 600 | 600 | |
| Escorez ™ 5400 | | | | | | 2.5 | | 2.5 | 5 | 5 |
| Escorez ™ 5600 | | | | | | | | 2.5 | | |
| Escorez ™ 5380 | | | | | | | 2.5 | | | |
| POLYWAX ™ 3000 | | | | | | | | | | |
| Licocene ™ PP6102 | | | | | | | | | | |
| AC ™596P | 5 | 4 | 3 | 2 | 2 | 2.5 | 2.5 | 0 | 5 | 5 |
| Irganox ™ 1010 | 0.5 | 0.5 | 0.5 | 0.5 | 0.5 | 0.5 | 0.5 | 0.5 | 0.5 | 0.5 |
| Physical Testing | | | | | | | | | | |
| Viscosity at 175° C., cP | 1580 | 1620 | 1650 | 1700 | 1660 | 1620 | | 1620 | 1480 | 1480 |

TABLE 8-continued

|  |  |  |  |  |  |  |  |  |  |
|---|---|---|---|---|---|---|---|---|---|
| % Fiber Tear, Room Temperature | 86 | 85 | 87 | 80 | 79 | 90 | 80 | 38 | 93 | 86 |
| % Fiber Tear, −18° C. | 89 | 93 | 84 | 91 | 94 | 79 | 82 | 58 | 91 | 93 |
| Tackifier Aromaticity (mol % aromatic protons) |  |  |  |  |  | 0 | 0 | 5 | 0 | 0 |
| Tackifier Softening Point (° C.) |  |  |  |  |  | 103 | 85 | 103 | 103 | 103 |

|  | 10G | 11G | 12G | 13G | 14G | 15G | 16G | 17G | 18G |
|---|---|---|---|---|---|---|---|---|---|
| Adhesive Components, wt % |  |  |  |  |  |  |  |  |  |
| Polymer Blend K | 90 | 90 | 92.5 | 92.5 | 92.5 | 90 | 90 | 92.5 | 90 |
| HPN-20E ™, ppm | 600 |  | 600 |  | 600 | 600 |  | 600 | 600 |
| Escorez ™ 5400 |  |  |  |  | 2.5 |  |  |  | 2.5 |
| Escorez ™ 5600 |  |  |  |  | 2.5 |  |  |  |  |
| Escorez ™ 5380 |  |  |  |  |  |  |  |  |  |
| POLYWAX ™ 3000 | 5 | 5 | 5 | 5 |  |  |  |  |  |
| Licocene ™ PP6102 |  |  |  |  |  | 5 | 5 | 5 | 5 |
| AC ™596P | 5 | 5 | 2.5 | 2.5 | 2.5 | 5 | 5 | 2.5 | 2.5 |
| Irganox ™ 1010 | 0.5 | 0.5 | 0.5 | 0.5 | 0.5 | 0.5 | 0.5 | 0.5 | 0.5 |
| Physical Testing |  |  |  |  |  |  |  |  |  |
| Viscosity at 175° C., cP | 1380 |  | 1450 |  | 1580 | 1600 |  | 1690 | 1630 |
| % Fiber Tear, Room Temperature | 88 | 81 | 75 | 82 | 85 | 88 | 88 | 80 | 92 |
| % Fiber Tear, −18° C. | 63 | 47 | 75 | 59 | 81 | 94 | 96 | 87 | 85 |
| Tackifier Aromaticity (mol % aromatic protons) |  |  |  |  | 5 |  |  |  | 0 |
| Tackifier Softening Point (° C.) |  |  |  |  | 103 |  |  |  | 103 |

TABLE 9

|  | Polymer | | Wax (wt %) | | Tackifier (wt %) | | | |
|---|---|---|---|---|---|---|---|---|
|  | Blend L (wt %) | AC ™596P (wt %) | POLYWAX ™ 3000 | Licocene ™ PE 4201 | Escorez ™ 5690 | PAFT (° C.) | Fiber Tear (−20° C.) | Set Time (seconds) |
| 1H | 80 | 5 | 5 |  | 10 | 56 | 100 | 1.5-2 |
| 2H | 80 | 5 |  | 5 | 10 | 50 | 50 | 2-2.5 |
| 3H | 82 | 3 | 5 |  | 10 | 55 | 50 | 1.5-2 |
| 4H | 82 | 3 |  | 5 | 10 | 48 | 50 | 2 |
| 5H | 82 | 5 | 3 |  | 10 | 59 | 100 | 2.5 |
| 6H | 82 | 5 |  | 3 | 10 | 60 | 100 | 3 |
| 7H | 84 | 3 | 3 |  | 10 | 54 | 100 | 2-2.5 |
| 8H | 84 | 3 |  | 3 | 10 | 48 | 75 | 2.5 |
| 9H | 87 | 3 | 5 |  | 5 | 50 | 100 | 1.5-2 |
| 10H | 87 | 3 |  | 5 | 5 | 49 | 100 | 1.5-2 |
| 11H | 87 | 5 | 3 |  | 5 | 62 | 100 | 2-2.5 |
| 12H | 87 | 5 |  | 3 | 5 | 47 | 100 | 2.5 |
| 13H | 90 | 5 |  | 5 |  | 37 | 100 | 1.5-2 |
| 14H | 92 | 3 | 5 |  |  | 47 | 100 | 1.5-2 |
| 15H | 92 | 3 |  | 5 |  | 44 | 100 | 1.5-2 |
| 16H | 92 | 5 | 3 |  |  | 47 | 100 | 2 |
| 17H | 92 | 5 |  | 3 |  | 40 | 100 | 2.5-3 |
| 18H | 94 | 3 | 3 |  |  | 49 | 100 | 2-2.5 |
| 19H | 94 | 3 |  | 3 |  | 46 | 100 | 2.5-3 |

TABLE 10

|  | 1i | 2i | 3i | 4i | 5i | 6i | 7i | 8i | 9i | 10i | 11i |
|---|---|---|---|---|---|---|---|---|---|---|---|
| Adhesive Components, wt % | | | | | | | | | | | |
| Polymer Blend N | 91 | 87 | 89 | 89 | 89 | 84 | 84 | 84 | 86 | 86 | 86 |
| EPOLENE ™ C-15 | | | | | | 5 | 5 | 5 | 5 | 5 | 5 |
| AC ™596P | 3.5 | 5 | 5 | 5 | 5 | 5 | 4 | 4 | | 3 | 3 |
| POLYWAX ™ 3000 | 5 | 3 | 3 | 3.5 | 5 | | 2.5 | 2.5 | 3 | 3 | |
| Sylvares ™ TP 2040 | | | 2 | 1.5 | | 2.5 | 3.5 | 3 | 5 | 2 | 2 |
| Escorez ™ 5690 | | 5 | | | | | | | | | |
| Irganox ™ 1010 | 0.5 | | 1 | 1 | 1 | 1 | 1 | 1 | 1 | 1 | 1 |
| Physical Testing | | | | | | | | | | | |
| Viscosity at 177° C., cP | | | 1480 | 1480 | | 1480 | 1480 | | 1520 | 1535 | |
| PAFT, ° C. | 46 | 54 | 59 | 46 | 48 | 67 | 69 | 74 | 36 | 66 | 62 |
| Fiber Tear, 3° C. | 100 | 100 | | | | 100 | 100 | | 50 | 100 | |
| Fiber Tear, −18° C. | 100 | 100 | 100 | 100 | 100 | 100 | 100 | | 0 | 100 | |
| IoPP, ° C. | 100 | 65 | 80 | 70 | 70 | 70 | 75 | 75 | | | |
| Set Time (seconds) | 1-1.5 | 2-2.5 | 1-1.5 | 1-1.5 | | | | | | | |

TABLE 11

| | Tackifier | | | | | |
|---|---|---|---|---|---|---|
| Polymer Blend M, wt % | Escorez ™ 5380 SP = 85° C. Mn = 190 g/mol Mw = 370 g/mol Aromaticity = 0 PAFT (° C.)/ Set Time (seconds) | Escorez ™ 5400 SP = 103° C. Mn = 190 g/mol Mw = 400 g/mol Aromaticity = 0 PAFT (° C.)/ Set Time (seconds) | Escorez ™ 5340 SP = 140° C. Mn = 230 g/mol Mw = 460 g/mol Aromaticity = 0 PAFT (° C.)/ Set Time (seconds) | Escorez ™ 5637 SP = 130° C. Mn = 300 g/mol Mw = 500 g/mol Aromaticity = 6 PAFT (° C.)/ Set Time (seconds) | Escorez ™ 5690 SP = 91° C. Mn = 250 g/mol Mw = 480 g/mol Aromaticity = 11 PAFT (° C.)/ Set Time (seconds) | Escorez ™ 5615 SP = 118° C. Mn = 310 g/mol Mw = 500 g/mol Aromaticity = 10 PAFT (° C.)/ Set Time (seconds) |
| 95 | 41, 43, 47, 43 AVG 43 STD 3/ 10 sec | 53, 51, 51, 49 AVG 51 STD 2/ 8.5 sec | 51, 46, 43, 51, AVG 48 STD 4/ 4.5 sec | 47, 53, 47, 50 AVG 49 STD 3/ 4.5 sec | 46, 53, 46, 51 AVG 49 STD 4/ 6 sec | 53, 51, 52, 51 AVG 52 STD 1/ 8 sec |
| 90 | 41, 41, 42, 34 AVG 41 STD 1/ 8 sec | 38, 43, 35, 37 AVG 38 STD 3/ 4 sec | 43, 47, 47, 41 AVG 45 STD 3/ 4 sec | 44, 43, 39, 37 AVG 41 STD 3/ 4 sec | 43, 46, 43, 45 AVG 44 STD 2/ 3 sec | 48, 40, 41, 45 AVG 44 STD 4/ 3 sec |
| 80 | 34, 34, 34, 36 AVG 35 STD 1/ 4 sec | 35, 36, 36, 36 AVG 36 STD 1/ 3 sec | 43, 45, 46, 44 AVG 45 STD 1/ 2.5 sec | 42, 42, 61, 44 AVG 43 STD 1/ 2 sec | 44, 45, 42, 41 AVG 43 STD 2/ 6.5 sec | 48, 61, 62, 48 AVG 55 STD 8/ 2 sec |

TABLE 12

| Tackifier | Polymer Blend O | Wax Cloud Point (° C.) | Polymer Blend P | Wax Cloud Point (° C.) |
|---|---|---|---|---|
| Escorez ™1102 | 0 | | 2 | |
| Escorez ™ 1310LC | 3 | | 3 | |
| Escorez ™ 1401 | 3 | | 3 | |
| Escorez ™ 2101 | 0 | | 0 | |
| Escorez ™ 2184 | 0 | | 0 | |
| Escorez ™ 2203LC | 3 | | 3 | |
| Escorez ™ 2173 | 0 | | 0 | |
| Escorez ™ 5300 | 1 | 88 | 3 | |
| Escorez ™ 5600 | 1 | 126 | 1 | 114 |
| Escorez ™ 5340 | 1 | 152 | 1 | 153 |

TABLE 13

|  | 1J | 2J | 3J | 4J | 5J | 6J | 7J | 8J | 9J | 10J | 11J | 12J | 13J | Comparative |
|---|---|---|---|---|---|---|---|---|---|---|---|---|---|---|
| Adhesive Components, wt % | | | | | | | | | | | | | | |
| Polymer Blend Q | 90.5 | 90.5 | 87.8 | 88.9 | 90.5 | 90.5 | 90.5 | 90.5 | 90.5 | 90.5 | 90.5 | 0 | 0 | Comparative B |
| Affinity ™ GA 1900 | | | | | | | | | | | | 34 | 34 | |
| Irganox ™ 1010 | 0.5 | 0.5 | 0.5 | 0.5 | 0.5 | 0.5 | 0.5 | 0.5 | 0.5 | 0.5 | 0.5 | 1 | 1 | |
| MAPP40 ™ | 3.5 | | | | | | | | | | | | | |
| AC ™596P | | 3.5 | 3.4 | 3.4 | 3.5 | 3.5 | 3.5 | 3.5 | 3.5 | 3.5 | 3.5 | | | |
| AC ™820 | | | | | | | | | | | 5.5 | | | |

TABLE 13-continued

|  | 1J | 2J | 3J | 4J | 5J | 6J | 7J | 8J | 9J | 10J | 11J | 12J | 13J | Comparative |
|---|---|---|---|---|---|---|---|---|---|---|---|---|---|---|
| AC ™810 |  |  |  |  |  |  |  |  |  | 5.5 |  |  |  |  |
| AC ™8 |  |  |  |  | 5.5 |  |  |  |  |  |  |  |  |  |
| AC ™9 |  |  |  |  |  |  |  |  | 5.5 |  |  |  |  |  |
| POLYWAX ™ 3000 |  |  | 5.3 | 5.4 |  |  | 5.5 |  |  |  |  |  |  |  |
| Sasolwax ™ H1 | 5.5 | 5.5 | 3.0 | 1.7 |  | 5.5 |  |  | 5.5 |  |  | 30 | 30 |  |
| Escorez ™ 5600 |  |  |  |  |  |  |  |  |  |  |  |  | 35 |  |
| Escorez ™ 5637 |  |  |  |  |  |  |  |  |  |  |  | 35 |  |  |
| Physical Testing |  |  |  |  |  |  |  |  |  |  |  |  |  |  |
| Viscosity at 190° C., cP | 648 | 645 | 615 | 688 |  | 643 | 895 | 743 | 650 | 655 | 675 | 283 | 255 | 680 |
| Viscosity at 177° C., cP | 908 | 863 | 838 | 928 |  | 680 | 920 | 1,010 | 890 | 878 | 888 | 370 | 353 | 903 |
| % Fiber Tear, Room Temp | 0 | 0 | 80 | 85 |  | 0 | 93.75 | 99 | 0 | 0 | 93 | 88 | 85 | 91 |
| Failure Mode | CF | CF | AF | AF |  | CF | AF | AF | CF | CF | AF | AF | AF | AF |
| % Fiber Tear, 84° C. | 3 | 1 | 94 | 99 |  | 20 | 88 | 99 | 0 | 66 | 98 | 97 | 99 | 98 |
| Failure Mode | CF | CF | 2AF; 2CF | 2AF; 2CF |  | CF | AF | AF | CF | CF | 2CF; 2AF | AF | AF | AF |
| % Fiber Tear, −2° C. | 0 | 0 | 81 | 0 |  | 0 | 90 | 99 | 0 | 1 | 79 | 6 | 20 | 84 |
| Failure Mode | CF | AF; 3CF | AF | CF |  | AF; 3CF | AF | 3AF; 1CF | CF | CF | 1CF; 3AF | CF | CF | AF |
| % Fiber Tear, 84° C. | 50 | 0 | 100 | 93 |  | 1 | 94 | 96 | 0 | 13 | 97 | 98 | 96 | 99 |
| Failure Mode | CF | CF | 3AF; 1CF | 3AF; 1CF |  | CF | AF | AF | CF | CF | 2CF; 2AF | AF | 3AF; 1CF | AF |

TABLE 14

| Adhesive Components, wt % | 1K | 2K | 3K | 4K | 5K | 6K | 7K | 8K | 9K | 10K | 11K | 12K | 13K | Comparative |
|---|---|---|---|---|---|---|---|---|---|---|---|---|---|---|
| Polymer Blend K |  |  | 90.5 |  |  |  |  |  |  |  |  |  |  | Comparative B |
| Polymer Blend R |  | 90.5 |  |  |  |  |  |  |  |  |  |  |  |  |
| Polymer Blend Q | 90.5 |  |  | 90.5 | 90.5 | 90.5 | 90.5 | 90.5 | 90.5 | 90.5 | 90.5 | 90.5 | 90.5 |  |
| Irganox ™ 1010 | 0.5 | 0.5 | 0.5 | 0.5 | 0.5 | 0.5 | 0.5 | 0.5 | 0.5 | 0.5 | 0.5 | 0.5 | 0.5 |  |
| AC ™596P | 3.5 | 3.5 | 3.5 | 3.5 | 3.5 | 3.5 | 3.5 | 3.5 |  |  | 3.5 | 3.5 |  |  |
| AC ™1325 |  |  |  |  |  |  |  |  | 3.5 | 3.5 |  |  | 3.5 |  |
| AC ™8 |  |  |  |  |  |  |  | 5.5 |  |  |  |  |  |  |
| AC ™9 | 5.5 | 5.5 | 5.5 |  |  |  | 2.75 |  | 5.5 |  |  |  | 3.5 |  |
| AC ™1089 |  |  |  |  |  |  |  |  |  | 5.5 |  |  | 2 |  |
| AC ™1660 |  |  |  |  |  |  |  |  |  |  | 5.5 |  |  |  |
| POLYWAX ™ 3000 |  |  |  |  |  | 2.75 | 2.75 |  |  |  | 5.5 |  |  |  |
| Sasolwax ™ H1 |  |  |  |  |  | 2.75 |  |  |  |  |  |  |  |  |
| Escorene ™ MV 02514 |  |  |  | 5.5 |  |  |  |  |  |  |  |  |  |  |
| Achieve ™ 6936G1 |  |  |  |  | 5.5 |  |  |  |  |  |  |  |  |  |

TABLE 14'

| Physical Testing | 1K | 2K | 3K | 4K | 5K | 6K | 7K | 8K | 9K | 10K | 11K | 12K | 13K | Comparative |
|---|---|---|---|---|---|---|---|---|---|---|---|---|---|---|
| Viscosity at 177° C., cP | 988 | 1170 | 1327 | 1120 | 1317 | 902 | 953 | 1,000 | 1,055 | 1,010 | 973 | 960 | 1,025 | 890 |
| % Fiber Tear, Room Temp | 100 | 95 | 99 | 99 | 91 | 91.3 | 100 | 100 | 48 | 82 | 96 | 92 | 89 | 100 |
| Failure Mode | AF | AF | AF | AF | AF | 1CF; 3AF | AF | AF | 1CF; 3AF | AF | AF | AF | 2CF; 2AF | AF |
| % Fiber Tear, −2° C. | 92.4 | 89 | 89 | 89 | 93 | 92 | 92 | 97 | 61 | 57 | 91 | 91 | 84 | 99 |
| Failure Mode | AF | 4AF; 1CF | 1AB; 3AF; 1CF | 2CF; 1AB; 1AF | AF/SF | 92 | AF/SF | 2CF; 3AF/SF | 1CF; 4AF; | AF | AF | 3A; 2CF | 1CF; 4AF | AF |
| Set time relative to Comparative | Same | Slower | Slower | Slower | Slower | Same | Same | Slightly Same | Same | Same | Slower | Slower | Same |  |

TABLE 15

| | 1L | 2L | 3L | 4L | 5L | 6L | Comparative |
|---|---|---|---|---|---|---|---|
| Adhesive Components, wt % | | | | | | | |
| Polymer Blend S | 90.5 | 90.5 | 90.5 | 90.5 | 90.5 | 90.5 | Comparative B |
| Irganox ™ 1010 | 0.5 | 0.5 | 0.5 | 0.5 | 0.5 | 0.5 | |
| AC ™596P | 3.5 | 3.5 | 3.5 | 3.5 | 3.5 | 3.5 | |
| AC ™9 | 5.5 | | | 2.75 | | | |
| POLYWAX ™ 3000 | | 5.5 | | 2.75 | 2.75 | | |
| POLYWAX ™ 2000 | | | | | | 5.5 | |
| Sasolwax ™ C80 | | | 5.5 | | | | |
| Parvan ™ 158 | | | | | 2.75 | | |
| Physical Testing | | | | | | | |
| Viscosity at 190° C., cP | 873 | 850 | 723 | 848 | 795 | 798 | 705 |
| Viscosity at 177° C., cP | 1168 | 1092 | 968 | 1135 | 1033 | 1095 | 825 |
| % Fiber Tear, Room Temperature | 100 | 100 | 96 | 100 | 100 | 98 | 97 |
| Failure Mode | AF | AF | CF | 2CF; AF | AF | AF | AF; CF |
| % Fiber Tear, 2° C. | 100 | 99 | 96 | 100 | 100 | 100 | 87 |
| Failure Mode | AF | 1CF; AF | CF | AF | AF | AF | CF; AF |
| % Fiber Tear, −18° C. | 100 | 100 | 98 | 100 | 100 | 68 | 15 |
| Failure Mode | AF | AF | AF | AF | AF | AF; 1CF | 2CF; AF |
| Set Time relative to Comparative | Slightly same | Slightly same | Slower | Slower | Slower | Same | |

TABLE 16

| Adhesive Components, wt % | 1M | 2M | 3M | 4M | 5M | 6M | 7M | 8M | Comparative |
|---|---|---|---|---|---|---|---|---|---|
| Polymer Blend Q | 90.5 | | | | | | 90.5 | | Comparative B |
| UL ™ 7720 | | | 29.5 | | | | | | |
| UL ™ 7710 | | 39.5 | | | | | | | |
| Affinity ™ GA 1900 | | | | 29.5 | 39.5 | 37.5 | | 27.5 | |
| INFUSE ™ 9807 | | | | | | 2 | | | |
| INFUSE ™ 9817 | | | | | | | | 2 | |
| Escorez ™ 5637 | | | | 35 | 35 | 35 | | 35 | |
| Escorez ™ 5400 | | 40 | 45 | | | | | | |
| Irganox ™ 1010 | 0.5 | 0.5 | 0.5 | 0.5 | 0.5 | 0.5 | 0.5 | 0.5 | |
| AC ™596P | 3.5 | | | | | | 3.5 | | |
| POLYWWAX ™ 3000 | | | | | | | 5.5 | | |
| Sasolwax ™ C80 | 5.5 | | | | | | | | |
| Microcrystalline Wax HMP ™ | | | 25 | | | | | | |
| Sasolwax ™ H1 | | 10 | | 35 | 25 | 25 | | 35 | |
| Parvan ™ 158 | | 10 | | | | | | | |

TABLE 16'

| Physical Testing | 1M | 2M | 3M | 4M | 5M | 6M | 7M | 8M | Comparative |
|---|---|---|---|---|---|---|---|---|---|
| Viscosity at 190° C., cP | 730 | 785 | 528 | 235 | 483 | 578 | 840 | 268 | 705 |
| Viscosity at 177° C., cP | 788 | 840 | 715 | 245 | 648 | 710 | 900 | 325 | 825 |
| % Fiber Tear, Room Temperature | 96 | 98 | 86 | 0 | 100 | 100 | 89 | 0 | 95 |
| Failure Mode | AF | AF | 1CF; 4AF | CF | AF:1CF | AF | AF | CF | AF |
| % Fiber Tear, 2° C. | 95 | 79 | 39 | 0 | 87 | 93 | 91 | 0 | 96 |
| Failure Mode | AF | AF | 1AF; CF | CF | AF:1CF | AF | AF | CF | AF |
| % Fiber Tear, −18° C. | 88 | 72 | 18 | 0 | 53 | 89 | 72 | 0 | 20 |
| Failure Mode | AF | 2CF; 3AF | CF | CF | 4CF; 1AF | AF | 2CF; 3AF | CF | 3CF; 2AF |
| % Fiber Tear, Aged for 6 weeks at −18° C. | 90 | 16 | 0 | 0 | 47 | 81 | 59 | 0 | 19 |
| Failure Mode | 2AF; 3CF | 1CF; 4AF | CF | CF | 2AF; 2CF | AF | 1CF; 4AF | CF | CF |
| Set time relative to Comparative | Slower | Slower | Faster | Faster | Same | Faster | Same | Faster | 1.5-1.75 seconds |

TABLE 17

|  | 1N | 2N | 3N | 4N | 5N | 6N | Comparative |
|---|---|---|---|---|---|---|---|
| Adhesive Components, wt % | | | | | | | |
| Polymer Blend K | 90.5 | 90.5 | 90.5 | 90.5 | 90.5 | 90.5 | Comparative B |
| Irganox ™ 1010 | 0.5 | 0.5 | 0.5 | 0.5 | 0.5 | 0.5 | |
| AC ™596P | 3.5 | 3.5 | 3.5 | 3.5 | 3.5 | 3.5 | |
| AC ™9 | 5.5 | | | 2.75 | | | |
| POLYWAX ™ 3000 | | 5.5 | | 2.75 | 2.75 | | |
| POLYWAX ™ 2000 | | | | | | 5.5 | |
| Sasolwax ™ C80 | | | 5.5 | | | | |
| Parvan ™ 158 | | | | | 2.75 | | |
| Physical Testing | | | | | | | |
| Viscosity at 190° C., cP | 1,070 | 1,013 | 910 | 1,053 | 970 | 1,002 | 705 |
| Viscosity at 177° C., cP | 1,397 | 1,307 | 1,185 | 1,367 | 1,237 | 1,287 | 865 |
| % Fiber Tear, Room Temperature | 100 | 100 | 87 | 100 | 100 | 100 | 92 |
| Failure Mode | AF | AF | 2AB; 1CF | AF | AF | AF | AF |
| % Fiber Tear, 2° C. | 93 | 88 | 92 | 100 | 98 | 30 | 44 |
| Failure Mode | AF | 2CF; AF | 1CF; AF | AF | AF | CF | CF; AF |
| % Fiber Tear, −18° C. | 98 | 43 | 77 | 100 | 99 | 24 | 17 |
| Failure Mode | AF | AF; 1CF | CF | AF | AF | 2CF; AF | CF; AF |
| % Fiber Tear, −18° C., Aged for 6 weeks at −18° C. | 93 | 35 | 92 | 86 | 89 | 66 | 0 |
| Failure Mode | 2AF; 2CF | AF; CF | CF | 3AF; CF | 3AF; CF | AF-AB; 2CF | 2CF; AF |
| Set time relative to Comparative | Slower | Slightly Slower | Slower | Slower | Slower | Slightly Slower | |
| Set time (seconds) | 2.5-3 | 1.75-2 | 2.5-3 | 2.5-3 | 2.5-3 | 2 | 1.5-1.75 |

TABLE 18

|  | 1P | 2P | 3P | 4P | 5P | 6P | 7P | 8P |
|---|---|---|---|---|---|---|---|---|
| Adhesive Components, wt % | | | | | | | | |
| Polymer Blend U | 65 | | | | 79.5 | | | 75.5 |
| Polymer Blend T | | 65 | 79.5 | 79.5 | | 76.5 | 75.5 | |
| Irganox ™ 1010 | 1 | 1 | 0.5 | 0.5 | 0.5 | 0.5 | 0.5 | 0.5 |
| AC ™596P | | | | | | 3 | 3 | 3 |
| POLYWAX ™ 3000 | 2 | 2 | 5 | 5 | 5 | 5 | 1 | 1 |
| Escorez ™ 5380 | | | 7.5 | | | | | |
| Escorez ™ 5400 | 15 | 15 | | 7.5 | 7.5 | 7.5 | 7.5 | 7.5 |
| Escorez ™ 5600 | 12 | 12 | | 7.5 | 7.5 | 7.5 | 7.5 | 7.5 |
| Escorez ™ 5690 | | | 7.5 | | | | | |
| EPOLENE ™ C-15 | | | | | | | 5 | 5 |
| Sasolwax ™ H1 | 5 | 5 | | | | | | |
| Physical Testing | | | | | | | | |
| % Fiber Tear, 0° C. | 10 | 0 | 10 | 50 | 100 | 80 | 100 | 100 |
| % Fiber Tear, −17° C. | 0 | 0 | 5 | 5 | 100 | 40 | 85 | 100 |

TABLE 19

|  | 1O | 2O | 3O | 4O | 5O | 6O | 7O | 8O |
|---|---|---|---|---|---|---|---|---|
| Adhesive Components, wt % | | | | | | | | |
| Polymer Blend T | 86.5 | 81.5 | 81.5 | 81.5 | 81.5 | 81.5 | 81.5 | 72 |
| Irganox ™ 1010 | 0.5 | 0.5 | 0.5 | 0.5 | 0.5 | 0.5 | 0.5 | 0.5 |

TABLE 19-continued

| | | | | | | | | |
|---|---|---|---|---|---|---|---|---|
| AC ™596P | 3 | 3 | 3 | 3 | 3 | 3 | 3 | |
| POLYWAX ™ 3000 | 3 | 3 | 3 | 3 | 3 | 3 | 3 | 7.5 |
| EPOLENE ™ C-15 | 5 | 5 | 5 | 5 | 5 | 5 | 5 | |
| Sylvares ™ TP 2040 | 2 | | | | | | | |
| Permalyn 2085 | | | 2 | | | | | |
| Escorez ™ 5600 | | 2 | | | | | | 15 |
| Sylvalite ™ RE100L | | | | 2 | | | | |
| Kristalex ™ 3100 | | | | | 2 | | | |
| Foral AX | | | | | | 2 | | |
| Xonatac NG-98 | | | | | | | 2 | |
| *Physical Testing* | | | | | | | | |
| Viscosity at 177° C. | 1425 | 1635 | 1675 | 1430 | 1345 | 1285 | 1435 | 1265 |
| PAFT, ° C. | 65 | 60 | 60 | 60 | 61 | 56 | 62 | 52 |
| SAFT, ° C. | 105 | 106 | 105 | 106 | 105 | 104 | 105 | 101 |
| % Fiber Tear, Room Temperature | 100 | 100 | 100 | 100 | 100 | 100 | 100 | 98 |
| % Fiber Tear, 2° C. | 72 | 100 | 100 | 100 | 100 | 100 | 100 | 43 |
| % Fiber Tear, −18° C. | 80 | 100 | 100 | 100 | 99 | 100 | 99 | 0 |
| Set Time, seconds | 1.5-1.7 | 2 | 1.5 | 1.3-1.5 | 1.5-1.7 | 1.7-2 | 1.5-1.7 | 1.7 |

| | 90 | 100 | 110 | 120 | 130 | 140 |
|---|---|---|---|---|---|---|
| *Adhesive Components, wt %* | | | | | | |
| Polymer Blend T | 72 | 72 | 72 | 72 | 72 | 72 |
| Irganox ™ 1010 | 0.5 | 0.5 | 0.5 | 0.5 | 0.5 | 0.5 |
| AC ™596P | | | | | | |
| POLYWAX ™ 3000 | 7.5 | 7.5 | 7.5 | 7.5 | 7.5 | 7.5 |
| EPOLENE ™ C-15 | | | | | | |
| Sylvares ™ TP 2040 | 15 | | | | | |
| Permalyn 2085 | | 15 | | | | |
| Escorez ™ 5600 | | | | | | |
| Sylvalite ™ RE100L | | | 15 | | | |
| Kristalex ™ 3100 | | | | 15 | | |
| Foral AX | | | | | 15 | 15 |
| Xonatac NG-98 | | | | | | |
| *Physical Testing* | | | | | | |
| Viscosity at 177° C. | 1280 | 1200 | 1225 | 1255 | 920 | 1210 |
| PAFT, ° C. | 41 | 53 | 47 | 52 | 43 | 53 |
| SAFT, ° C. | 101 | 103 | 102 | 100 | 101 | 101 |
| % Fiber Tear, Room Temperature | | 0 | 0 | 0 | 51 | 94 |
| % Fiber Tear, 2° C. | | 0 | 0 | 0 | 4 | 53 |
| % Fiber Tear, −18° C. | | 0 | 0 | 0 | 0 | 1 |
| Set Time, seconds | | 1.5-1.7 | 1.5 | 1.5 | 1.5-1.7 | 1.5-1.7 |

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. An adhesive composition comprising:
   a polymer blend comprising
      a first propylene-based polymer, wherein the first propylene-based polymer is a homopolymer of propylene or a copolymer of propylene and ethylene or a $C_4$ to $C_{10}$ alpha-olefin;
      a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer;

wherein the polymer blend has a melt viscosity, measured at 190° C. of about 900 cP to about 19,000 cP and wherein, when subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %; and a tackifier having a softening point, as determined by ASTM E-28, of about 85 to about 135° C. and an aromaticity of about 2 to about 12 mol % aromatic protons.

2. The adhesive composition of claim 1, wherein the tackifier has a softening point, as determined by ASTM E-28, of about 85 to about 125° C.

3. The adhesive composition of claim 1, wherein the tackifier has a softening point, as determined by ASTM E-28, of about 95 to about 110° C.

4. The adhesive composition of claim 1, wherein the tackifier has an aromaticity of about 4 to about 12 mol % aromatic protons.

5. The adhesive composition of claim 1, wherein the tackifier has an aromaticity of about 7 to about 12 mol % aromatic protons.

6. The adhesive composition of claim 1, wherein the tackifier is present in the amount of less than about 20 wt % of the adhesive composition.

7. The adhesive composition of claim 1, wherein the tackifier may be a single tackifier or a blend of one or more tackifiers.

8. The adhesive composition of claim 1, further comprising an antioxidant present in the amount of about 0.01 to about 1 wt % of the adhesive composition.

9. The adhesive composition of claim 1, further comprising a wax present in the amount of less than about 15 wt % of the adhesive composition.

10. The adhesive composition of claim 1, further comprising a nucleating agent.

11. The adhesive composition of claim 10, wherein the nucleating agent is present in an amount of about 200 to about 5000 ppm of the adhesive composition.

12. An article comprising the adhesive composition of claim 1.

13. An article of claim 12, wherein the adhesive composition adheres two substrates, and wherein each substrate comprises at least one of paper, cardboard, plastic, nonwoven, metal, wood, other natural fiber based material, or combinations thereof.

14. An adhesive composition comprising:
a polymer blend comprising
   a first propylene-based polymer, wherein the first propylene-based polymer is a homopolymer of propylene or a copolymer of propylene and ethylene or a $C_4$ to $C_{10}$ alpha-olefin;
   a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer;
wherein the polymer blend has a melt viscosity, measured at 190° C. of about 900 cP to about 19,000 cP; and wherein, when subjected to Temperature Rising Elution Fractionation, the polymer blend exhibits: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %; and
a tackifier;
wherein the adhesive composition has a viscosity, measured at 177° C. and determined according to ASTM D-3236, from about 350 cP to about 2,000 cP.

15. The adhesive composition of claim 14, wherein the tackifier is present in the amount of less than about 40 wt % of the adhesive composition.

16. The adhesive composition of claim 14, wherein the tackifier may be a single tackifier or a blend of one or more tackifiers.

17. The adhesive composition of claim 14, wherein the tackifier has a softening point, as determined by ASTM E-28, of about 85 to about 135° C. and an aromaticity of about 2 to about 12 mol % aromatic protons.

18. The adhesive composition of claim 14, further comprising an antioxidant present in the amount of about 0.01 to 1 wt % of the adhesive composition.

19. The adhesive composition of claim 14, further comprising a wax present in the amount of less than about 35 wt % of the adhesive composition.

20. An article comprising the adhesive composition of claim 14.

21. An article of claim 20, wherein the adhesive composition adheres two substrates, and wherein each substrate comprises at least one of paper, cardboard, plastic, nonwoven, metal, wood, other natural fiber based material, or combinations thereof.

* * * * *